US011772715B2

(12) United States Patent
Norris

(10) Patent No.: US 11,772,715 B2
(45) Date of Patent: Oct. 3, 2023

(54) COMPOSITE PANEL WITH CONNECTING STRIP AND METHOD

(71) Applicant: Wabash National, L.P., Lafayette, IN (US)

(72) Inventor: Melvin Norris, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 681 days.

(21) Appl. No.: 16/832,345

(22) Filed: Mar. 27, 2020

(65) Prior Publication Data

US 2020/0307723 A1 Oct. 1, 2020

Related U.S. Application Data

(60) Provisional application No. 62/824,408, filed on Mar. 27, 2019.

(51) Int. Cl.
*B62D 33/04* (2006.01)
*E04C 2/00* (2006.01)

(52) U.S. Cl.
CPC ........... *B62D 33/046* (2013.01); *E04C 2/00* (2013.01)

(58) Field of Classification Search
CPC ............................. B62D 33/046; E04C 2/00
See application file for complete search history.

(56) References Cited

U.S. PATENT DOCUMENTS

| | | |
|---|---|---|
| 2,294,930 A | 9/1942 | Palmquist |
| 2,719,809 A | 10/1955 | Herts |
| 2,934,372 A | 4/1960 | Jewell |
| 3,072,225 A | 1/1963 | Cremer |
| 3,249,659 A | 5/1966 | Voelker |
| 3,420,023 A | 1/1969 | Gregori |
| 3,515,615 A | 6/1970 | Okada |
| 3,617,351 A | 11/1971 | Long |
| 3,817,671 A | 6/1974 | Lemelson |
| 4,128,369 A | 12/1978 | Kemerer et al. |
| 4,340,129 A | 7/1982 | Salyers |
| 4,557,100 A | 12/1985 | Gorges |
| 4,578,297 A | 3/1986 | Duncan |
| 4,701,369 A | 10/1987 | Duncan |

(Continued)

FOREIGN PATENT DOCUMENTS

| | | |
|---|---|---|
| CA | 2165016 A1 | 6/1996 |
| EP | 2133184 A1 | 12/2009 |

(Continued)

OTHER PUBLICATIONS

Non-Final Rejection dated Sep. 1, 2009, for U.S. Appl. No. 11/859,014, 8 pages; obtained from USPTO records, U.S. Pat. No. 9,908,315.

(Continued)

*Primary Examiner* — Babajide A Demuren
(74) *Attorney, Agent, or Firm* — Quarles & Brady LLP

(57) ABSTRACT

A composite panel for a storage container and method for producing a composite panel is provided. The composite panel includes a composite assembly and a metallic connecting strip. The composite assembly includes a first polymer skin, a second polymer skin, and a core disposed between the first polymer skin and the second polymer skin. The metallic connecting strip is bonded to the composite assembly.

16 Claims, 14 Drawing Sheets

(56) References Cited

U.S. PATENT DOCUMENTS

| | | |
|---|---|---|
| 4,708,757 A | 11/1987 | Guthrie |
| 4,709,781 A | 12/1987 | Scherzer |
| 4,783,287 A | 11/1988 | Eichberger et al. |
| 4,796,397 A | 1/1989 | Capaul |
| 4,817,264 A | 4/1989 | Worthing |
| 4,879,152 A | 11/1989 | Green |
| 4,930,266 A | 6/1990 | Calhoun et al. |
| 4,940,279 A | 7/1990 | Abott et al. |
| 5,042,395 A | 8/1991 | Wackerle et al. |
| 5,066,531 A | 11/1991 | Legg et al. |
| 5,186,996 A | 2/1993 | Alts |
| 5,214,991 A | 6/1993 | Shimizu et al. |
| 5,275,848 A | 1/1994 | Mito et al. |
| 5,328,744 A | 7/1994 | Kaufmann et al. |
| 5,507,405 A | 4/1996 | Thomas et al. |
| 5,554,246 A | 9/1996 | Anwyll, Jr. |
| 5,580,636 A | 12/1996 | Kampmann et al. |
| 5,604,021 A | 2/1997 | Wagner |
| 5,698,308 A | 12/1997 | Sumiya et al. |
| 5,702,798 A | 12/1997 | Sugita et al. |
| 5,718,965 A | 2/1998 | Shiroeda et al. |
| 5,774,972 A | 7/1998 | Ehrlich |
| 5,779,847 A | 7/1998 | Groeger |
| 5,851,342 A | 12/1998 | Vydra et al. |
| 5,860,693 A | 1/1999 | Ehrlich |
| 5,899,037 A | 5/1999 | Josey |
| 5,919,545 A | 7/1999 | Giezendanner et al. |
| 5,979,684 A | 11/1999 | Ohnishi et al. |
| 5,997,076 A | 12/1999 | Ehrlich |
| 6,007,890 A | 12/1999 | DeBlander |
| 6,080,495 A | 6/2000 | Wright |
| 6,199,939 B1 | 3/2001 | Ehrlich |
| 6,220,651 B1 | 4/2001 | Ehrlich |
| 6,266,865 B1 | 7/2001 | Ehrlich |
| 6,276,748 B1 | 8/2001 | Gobessi et al. |
| 6,355,302 B1 | 3/2002 | Vandenberg et al. |
| 6,368,721 B1 | 4/2002 | Watanabe et al. |
| 6,383,559 B1 | 5/2002 | Nakamura et al. |
| 6,412,854 B2 | 7/2002 | Ehrlich |
| 6,537,413 B1 | 3/2003 | Hochet et al. |
| 6,546,694 B2 | 4/2003 | Clifford |
| 6,635,202 B1 | 10/2003 | Bugg et al. |
| 6,638,636 B2 | 10/2003 | Tucker |
| 6,680,017 B1 | 1/2004 | Koch et al. |
| RE38,508 E | 4/2004 | Wright |
| 6,824,851 B1 | 11/2004 | Locher et al. |
| 6,843,525 B2 | 1/2005 | Preisler |
| 6,852,386 B2 | 2/2005 | Nadezhdin et al. |
| 6,866,492 B2 | 3/2005 | Hauber et al. |
| 6,986,546 B2 | 1/2006 | Ehrlich |
| 7,014,253 B2 | 3/2006 | Oren |
| 7,017,981 B2 | 3/2006 | Strohmavr et al. |
| 7,056,567 B2 | 6/2006 | ONeill et al. |
| 7,069,702 B2 | 7/2006 | Ehrlich |
| 7,128,365 B2 | 10/2006 | Kiesewetter et al. |
| 7,155,797 B2 | 1/2007 | Kim |
| 7,255,822 B2 | 8/2007 | Bledsoe et al. |
| 7,338,696 B2 | 3/2008 | Rambaud et al. |
| 7,540,932 B2 | 6/2009 | Rub et al. |
| 7,553,435 B2 | 6/2009 | McCollum |
| 7,722,112 B2 | 5/2010 | Ehrlich |
| 7,722,122 B2 | 5/2010 | Mittelstadt |
| 7,758,487 B2 | 7/2010 | Elsayed et al. |
| 7,785,518 B2 | 8/2010 | Wirt et al. |
| 7,814,658 B2 | 10/2010 | Akishev et al. |
| 7,842,147 B2 | 11/2010 | Shen et al. |
| 8,087,494 B2 | 1/2012 | Palumbo et al. |
| 8,273,208 B2 | 9/2012 | Brinner |
| 8,336,933 B2 | 12/2012 | Nagwanshi et al. |
| 8,474,583 B2 | 7/2013 | Nagwanshi et al. |
| 8,524,351 B2 | 9/2013 | Ross |
| 8,584,433 B2 | 11/2013 | Masuda |
| 8,663,523 B2 | 3/2014 | Bradford et al. |
| 8,690,233 B2 | 4/2014 | Preisler et al. |
| 8,726,613 B2 | 5/2014 | Rhee et al. |
| 8,764,089 B2 | 7/2014 | Preisler et al. |
| 8,770,344 B2 | 7/2014 | Borroni |
| 8,795,465 B2 | 8/2014 | Preisler et al. |
| 8,795,807 B2 | 8/2014 | Preisler et al. |
| 8,808,827 B2 | 8/2014 | Preisler et al. |
| 8,808,828 B2 | 8/2014 | Preisler et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler et al. |
| 8,808,834 B2 | 8/2014 | Preisler et al. |
| 8,808,835 B2 | 8/2014 | Preisler et al. |
| 8,834,985 B2 | 9/2014 | Preisler et al. |
| 8,845,947 B2 | 9/2014 | Wirt et al. |
| 8,852,711 B2 | 10/2014 | Preisler et al. |
| 8,859,074 B2 | 10/2014 | Preisler et al. |
| 8,883,285 B2 | 11/2014 | Preisler et al. |
| 8,945,327 B2 | 2/2015 | Stamp et al. |
| 8,995,138 B2 | 3/2015 | Preisler et al. |
| 9,010,834 B2 | 4/2015 | Preisler et al. |
| 9,126,537 B2 | 9/2015 | Preisler et al. |
| 9,283,895 B2 | 3/2016 | Sumi et al. |
| 9,308,945 B2 | 4/2016 | Preisler et al. |
| RE45,991 E | 5/2016 | Preisler et al. |
| 9,346,375 B2 | 5/2016 | Preisler et al. |
| 9,550,336 B2 | 1/2017 | Bradford |
| 9,908,315 B2 | 3/2018 | Speer |
| 10,239,566 B2 | 3/2019 | Bauer et al. |
| 2001/0011832 A1 | 8/2001 | Ehrlich et al. |
| 2002/0014302 A1 | 2/2002 | Fanucci et al. |
| 2002/0098341 A1 | 7/2002 | Schiffer et al. |
| 2002/0109377 A1 | 8/2002 | Ehrlich |
| 2002/0176960 A1 | 11/2002 | Nadezhdin et al. |
| 2003/0186029 A1 | 10/2003 | Ogawa et al. |
| 2004/0055248 A1 | 3/2004 | Grillos |
| 2004/0217631 A1 | 11/2004 | Ehrlich |
| 2005/0087899 A1 | 4/2005 | Coon et al. |
| 2005/0123720 A1 | 6/2005 | Suzuki et al. |
| 2005/0204561 A1 | 9/2005 | Kim |
| 2005/0225118 A1 | 10/2005 | Oren |
| 2005/0257893 A1 | 11/2005 | Rub et al. |
| 2006/0028050 A1 | 2/2006 | Ehrlich |
| 2006/0241542 A1 | 10/2006 | Gudnason et al. |
| 2007/0004813 A1 | 1/2007 | Shelby et al. |
| 2007/0056687 A1 | 3/2007 | Brinner |
| 2007/0196681 A1 | 8/2007 | Biggs et al. |
| 2007/0256379 A1 | 11/2007 | Edwards |
| 2008/0111393 A1 | 5/2008 | Ehrlich |
| 2008/0116718 A1 | 5/2008 | Lewallen et al. |
| 2009/0202785 A1 | 8/2009 | Meyer Zu Drewer et al. |
| 2009/0206631 A1 | 8/2009 | Lewallen et al. |
| 2009/0297763 A1 | 12/2009 | Ross |
| 2009/0324905 A1 | 12/2009 | Welch et al. |
| 2010/0227087 A1 | 9/2010 | Naldi |
| 2011/0089183 A1 | 4/2011 | Gundelsheimer |
| 2011/0095574 A1 | 4/2011 | Brown |
| 2011/0135862 A1 | 6/2011 | Sumi et al. |
| 2011/0214384 A1* | 9/2011 | O'Rourke .............. E06B 1/62 156/227 |
| 2011/0250384 A1 | 10/2011 | Sumi et al. |
| 2012/0040135 A1 | 2/2012 | Werthen et al. |
| 2013/0207415 A1* | 8/2013 | Wylezinski ........... B62D 25/06 296/210 |
| 2013/0221702 A1* | 8/2013 | Katz ................... B62D 33/046 296/186.1 |
| 2013/0224419 A1* | 8/2013 | Lee ..................... B62D 33/044 428/161 |
| 2014/0044914 A1 | 2/2014 | Kurtz et al. |
| 2014/0127452 A1 | 5/2014 | Dietz et al. |
| 2014/0147622 A1* | 5/2014 | Preisler ............... B60R 13/011 428/116 |
| 2014/0178636 A1 | 6/2014 | Wu et al. |
| 2014/0345795 A1 | 11/2014 | Speer |
| 2014/0349077 A1 | 11/2014 | Sumi et al. |
| 2015/0130220 A1 | 5/2015 | Preisler et al. |
| 2015/0130221 A1 | 5/2015 | Preisler et al. |
| 2015/0132532 A1 | 5/2015 | Preisler et al. |
| 2015/0145276 A1 | 5/2015 | Preisler et al. |
| 2015/0273810 A1 | 10/2015 | Carretta |

(56) References Cited

U.S. PATENT DOCUMENTS

| | | | |
|---|---|---|---|
| 2015/0306840 A1 | 10/2015 | Ferguson, Jr. | |
| 2016/0107706 A1* | 4/2016 | McCormack | B60Q 3/30 |
| | | | 296/182.1 |
| 2016/0176149 A1 | 6/2016 | Manderfeld et al. | |
| 2017/0240216 A1* | 8/2017 | Bauer | B62D 29/005 |

FOREIGN PATENT DOCUMENTS

| | | | | |
|---|---|---|---|---|
| EP | 2881309 A1 * | 6/2015 | ........... | B32B 15/085 |
| EP | 3210860 A1 * | 8/2017 | ........... | B62D 33/046 |
| JP | H0387461 A | 4/1991 | | |
| JP | 2003285397 A | 10/2003 | | |
| JP | 2005238622 A | 9/2005 | | |
| WO | 9014943 A1 | 12/1990 | | |
| WO | 9300845 A1 | 1/1993 | | |
| WO | 0024559 A1 | 5/2000 | | |
| WO | 0244493 A1 | 6/2002 | | |
| WO | 2005077654 A1 | 8/2005 | | |
| WO | 2006128632 A1 | 12/2006 | | |
| WO | 2008141688 A2 | 11/2008 | | |
| WO | 2010050242 A1 | 5/2010 | | |
| WO | 2010069994 A2 | 6/2010 | | |

OTHER PUBLICATIONS

Non-Final Rejection dated Oct. 1, 2013, for U.S. Appl. No. 13/204,762, 18 pages; obtained from USPTO records, U.S. Pat. No. 9,908,315.
Final Rejection dated Apr. 9, 2014, for U.S. Appl. No. 13/204,762, 17 pages; obtained from USPTO records, U.S. Pat. No. 9,908,315.
International Search Report and Written Opinion issued in corresponding PCT/US2018/018151 dated Apr. 5, 2018, 6 pages.
International Search Report and Written Opinion issued in corresponding PCT/US2018/015984 dated Apr. 19, 2018, 7 pages.

* cited by examiner

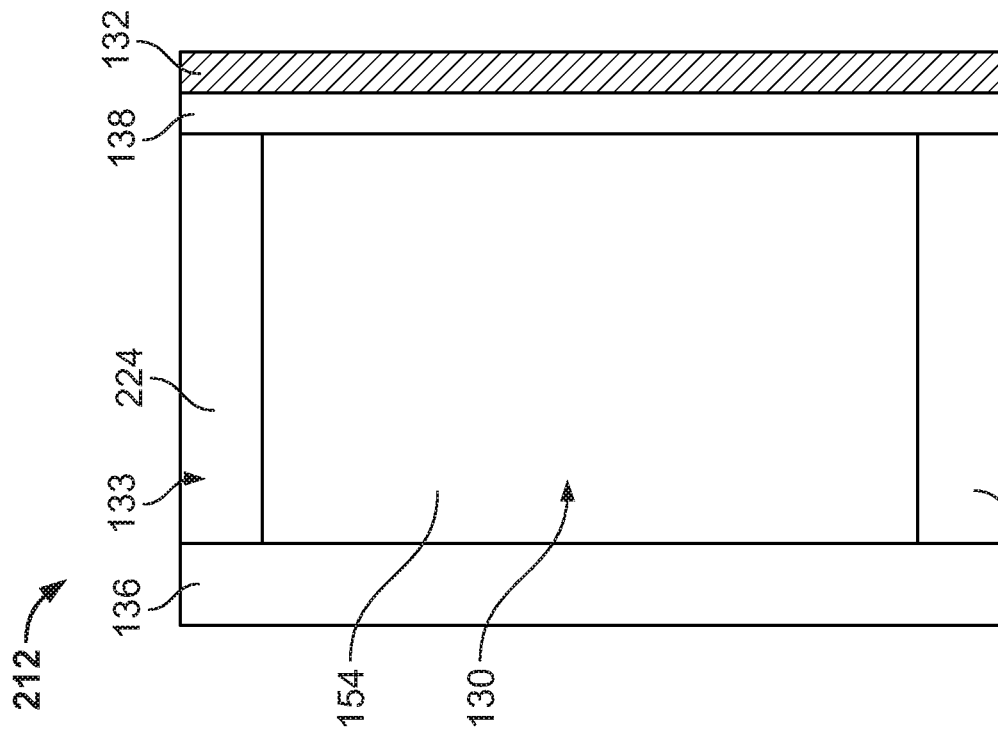
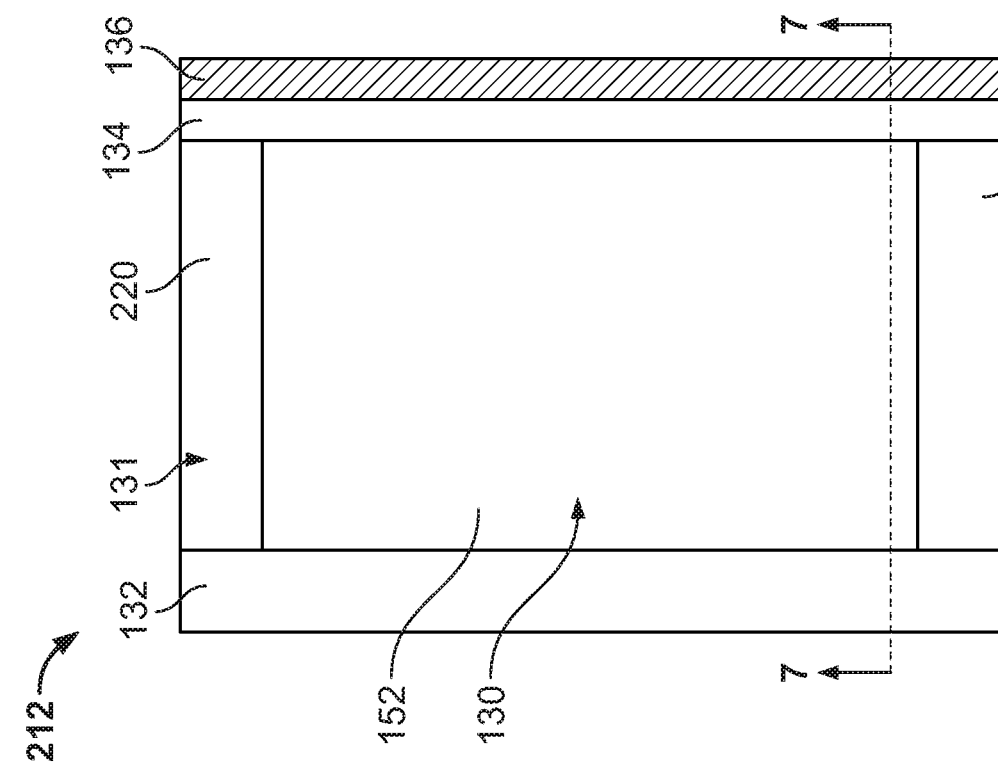

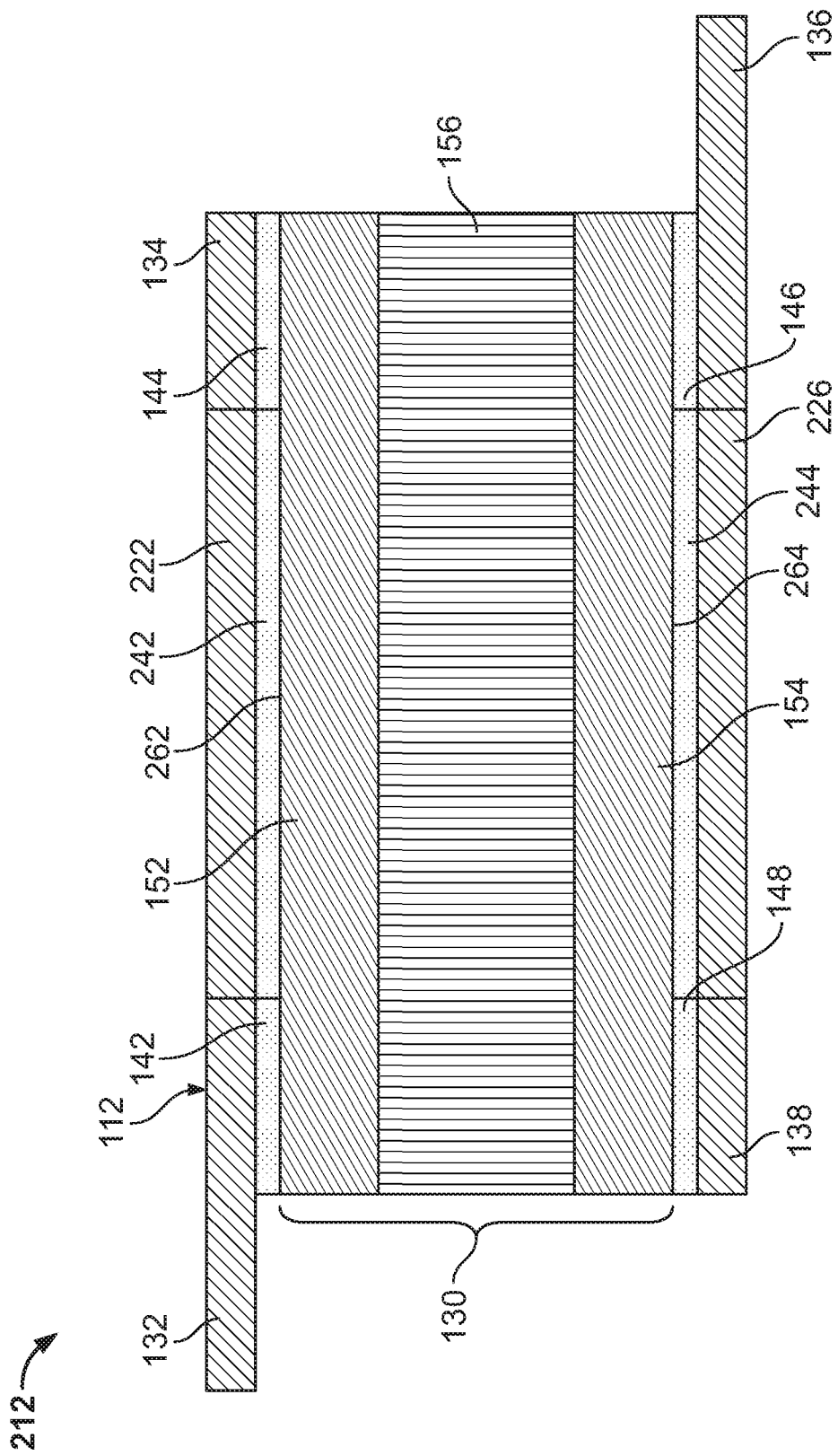

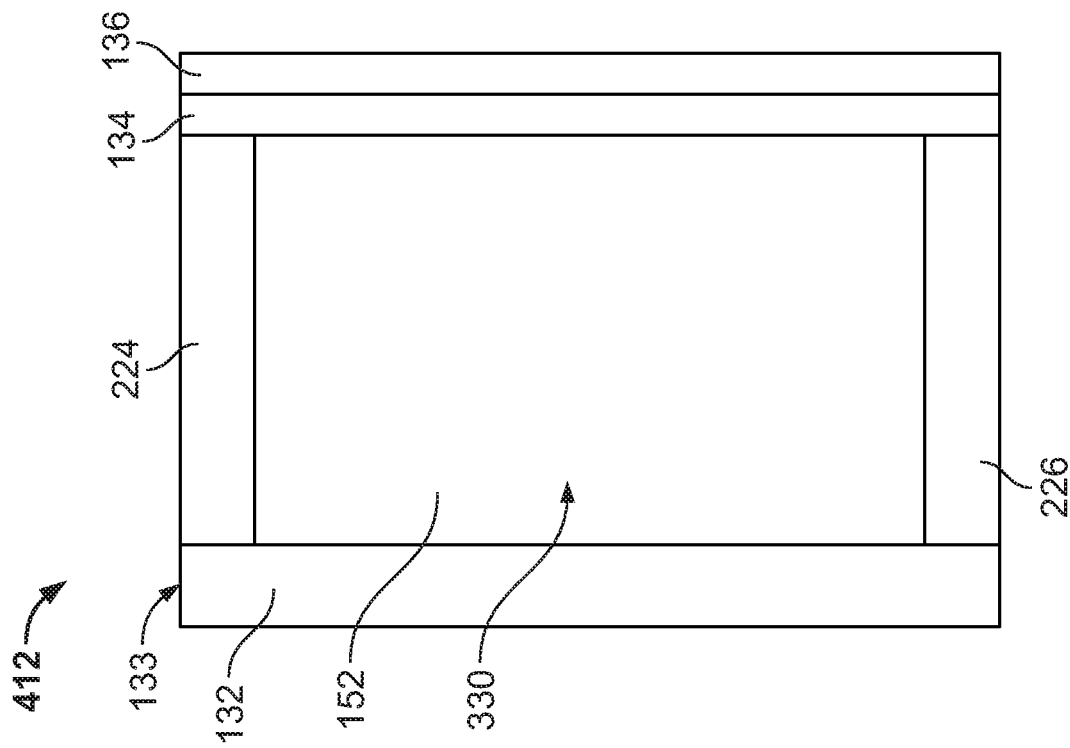
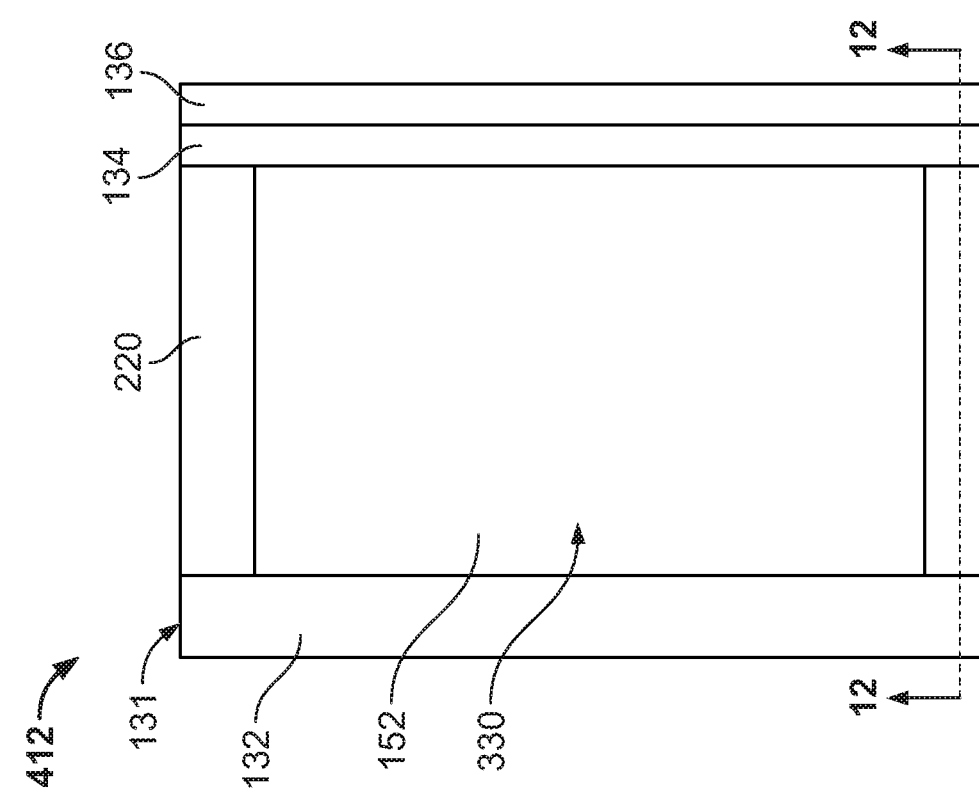

COMPOSITE PANEL WITH CONNECTING STRIP AND METHOD

RELATED APPLICATIONS

This application claims priority under 35 U.S.C. § 119 to U.S. Provisional Patent Application No. 62/824,408 filed on Mar. 27, 2019, the entire contents of which is incorporated herein by reference.

BACKGROUND

Many storage trailers, including those for commercial trucking, consist of sidewalls and doors constructed from composite materials. Composite materials or panels, also called sandwich panels, may have a plastic core disposed between two outer skins. For example, Wabash National Corporation of Lafayette, Ind. makes DURAPLATE® composite panels that have a high-density polyethylene (HDPE) plastic core bonded between two high-strength, high-tension steel plates. As another example, some composite panels may have a core disposed between two glass-reinforced plastic (GRP) skins.

Cores of composite panels may be constructed from a plurality of structures including a network of cells. One such network of cells is made from an arrangement of hexagons that produce a honeycomb structure with alternating geometric structures and air pockets. In some instances, these partially hollow cores use less plastic than completely solid and/or foamed plastic cores, cutting down on material costs. Additionally, partially hollow cores weigh less than completely solid cores and have higher density to strength ratios. However, some cores may lack the strength required for mechanical fastening used in many commercial applications. Further, due to process machinery limitations, in many cases the partially hollow cores may be only produced at a predetermined width and/or a predetermined length, and therefore may not be produced at a desired length and/or a desired width suitable for the end use application.

SUMMARY

Some embodiments provide a composite panel for a storage container including a composite assembly and a metallic connecting strip. The composite assembly includes a first polymer skin, a second polymer skin, and a core disposed between the first polymer skin and the second polymer skin. The metallic connecting strip is bonded to the composite assembly.

Some embodiments provide a wall assembly for a storage container including a plurality of composite panels coupled together. Each of the plurality of composite panels includes a composite assembly and a metallic connecting strip. The composite assembly includes a first polymer skin, a second polymer skin, and a core disposed between the first polymer skin and the second polymer skin. The metallic connecting strip is bonded to the composite assembly.

Some embodiments provide a method for producing a composite panel for a storage container. The composite panel includes a composite assembly with a first polymer skin, a second polymer skin, and a core, and a metallic connecting strip. The method includes laminating the core between the first polymer skin and the second polymer skin and applying an adhesive strip to the metallic connecting strip to form a strip assembly. The method further includes introducing the strip assembly to the first polymer skin and laminating the strip assembly to the first polymer skin.

BRIEF DESCRIPTION OF THE DRAWINGS

FIG. 6A is a side view of a composite panel, according to some embodiments;

FIG. 6B is an opposite side view of the composite panel of FIG. 6A;

FIG. 7 is a cross-sectional view of the composite panel of FIGS. 6A and 6B taken along line 7-7 of FIG. 6A;

FIG. 11A is a side view of a composite panel, according to some embodiments;

FIG. 11B is an opposite side view of the composite panel of FIG. 11A;

DETAILED DESCRIPTION

Figure 1:
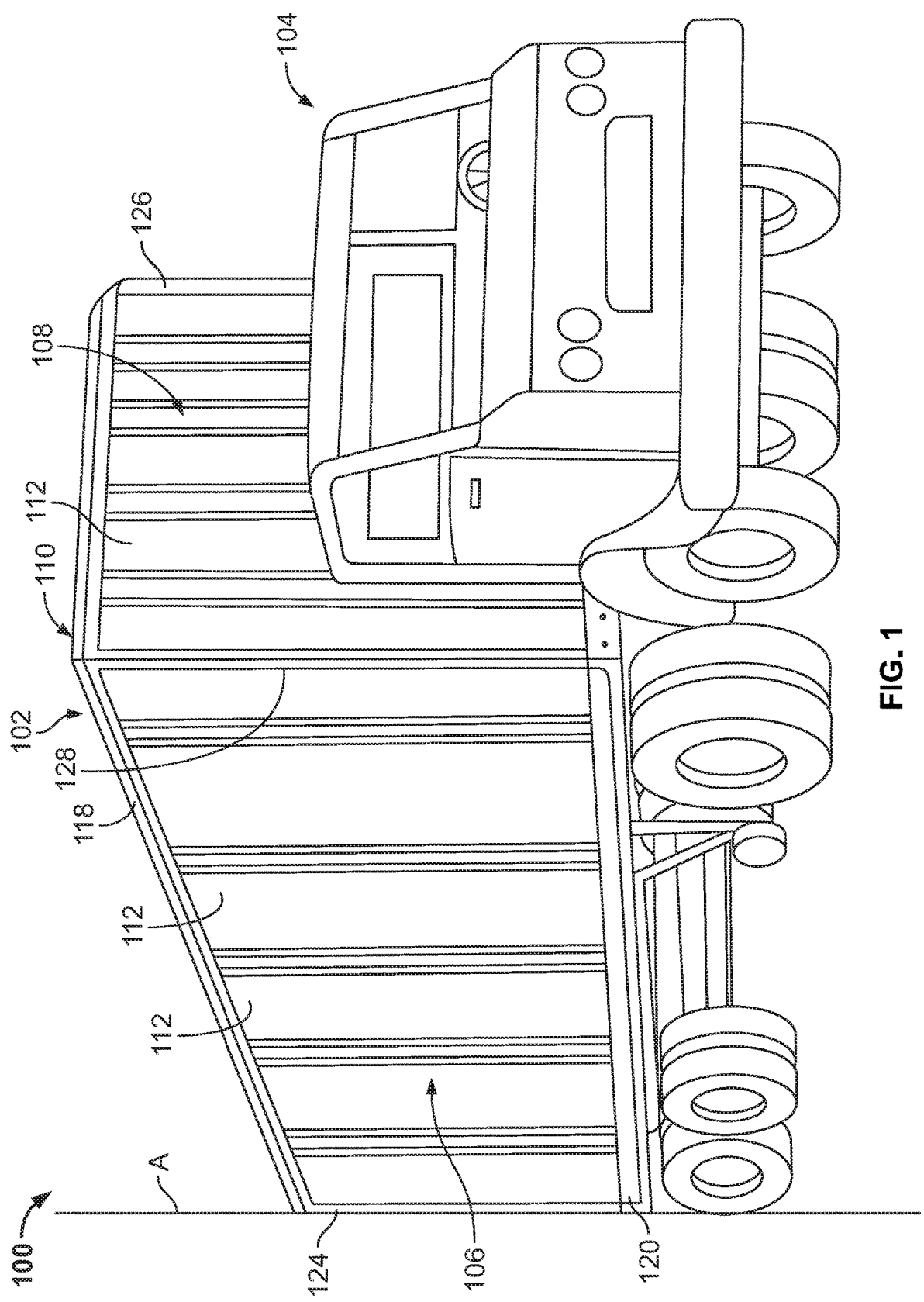
FIG. 1 is an isometric view of a trailer having walls that include a plurality of composite panels, according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Additionally, the term "bonded" and variations thereof are used broadly to encompass any type of adhesive coupling, thermal bond, chemical bond, fusing, gluing, welding, or other methods of joining components. Moreover, the term "glued," "adhered," "cemented," and variations thereof are used broadly and encompass various methods of joining or adhering both similar and dissimilar materials to one another.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

This disclosure relates generally to panel walls for storage containers such as trailers and truck bodies and, more particularly, to composite panels and methods for making composite panels.

FIG. 1 depicts a tractor trailer assembly 100 including a trailer 102 designed to carry cargo and a tractor 104 having an engine and a cab section. The trailer 102 may be substantially rectangular and may be defined by one or more sidewalls 106, a front end wall assembly 108, a roof assembly 110, and a rear end wall assembly (not shown), which may include an overhead door. Further, the trailer 102 may be defined by a floor assembly (not depicted) disposed opposite the roof assembly 110. Alternatively, the rear end wall assembly may include two doors mounted in a conventional manner such that the doors are hingedly coupled to and swing between an open position and a closed position. Further, the trailer 102 may be releasably coupled to the tractor 104 by conventional means, such as a fifth wheel, for example.

According to some embodiments, portions of each sidewall 106, the front end wall assembly 108, the roof assembly 110, the floor assembly, and/or the rear end wall assembly of the trailer 102 may be made from one or more composite panels 112. While the composite panels 112 are shown and described herein with reference to the trailer 102, it should be understood that the composite panels 112 may be part of any type of storage container (e.g., trailers, truck bodies, vans, stand-alone portable or permanent containers, and the like).

The composite panels 112 may be coupled to each other using adhesives, as described in more detail below. Additionally, as shown in FIG. 1, the composite panels 112 may be coupled to a top rail 118 and a bottom rail 120 using adhesives. One or more of the composite panels 112 may also be coupled to one or more vertically oriented rails 124, 126, 128 that are aligned with and substantially parallel to a longitudinal axis A of the trailer 102 using adhesives. The vertical rails 124, 126, 128 may be disposed between the composite panels 112 at various points along the length of the trailer 102, such as at front and rear ends of the trailer 102 and/or between the front and rear ends of the trailer 102. For example, the vertical rails 126, 128 may be part of a front frame of the trailer 102, and the vertical rail 124 (and a fourth vertical rail, not shown) may be part of a rear frame of the trailer 102.

More specifically, as shown in FIG. 1, the composite panel(s) 112 of the first side wall 106 may be coupled to the first vertical rail 124, the second vertical rail 128, the top rail 118, and the bottom rail 120 using adhesives. The composite panel(s) 112 of the front end wall 108 may be coupled to the top rail 118, the bottom rail 120, the second vertical rail 128, and the third vertical rail 126 using adhesives. The composite panel(s) 112 of the rear end wall assembly may be coupled to the first vertical rail 124, the top rail 118, the bottom rail 120, and the fourth vertical rail (not shown) using adhesives. The composite panel(s) 112 of a second side wall (not shown) may be coupled to the top rail 118, the bottom rail 120, the third vertical rail 126, and the fourth vertical rail using adhesives. The roof 110 may be coupled to the top rail 118 using adhesives. The floor assembly may be coupled to the bottom rail 120 using adhesives. In some embodiments, other joint configurations, for example, rivets, screws, bolts, nails, welding adhesives, and the like, may also be used to couple adjacent composite panels 112 together, composite panels 112 to the top rail 118 and/or the bottom rails 120, and/or the composite panels 112 to the vertical rails 124, 126 128.

Figure 2:
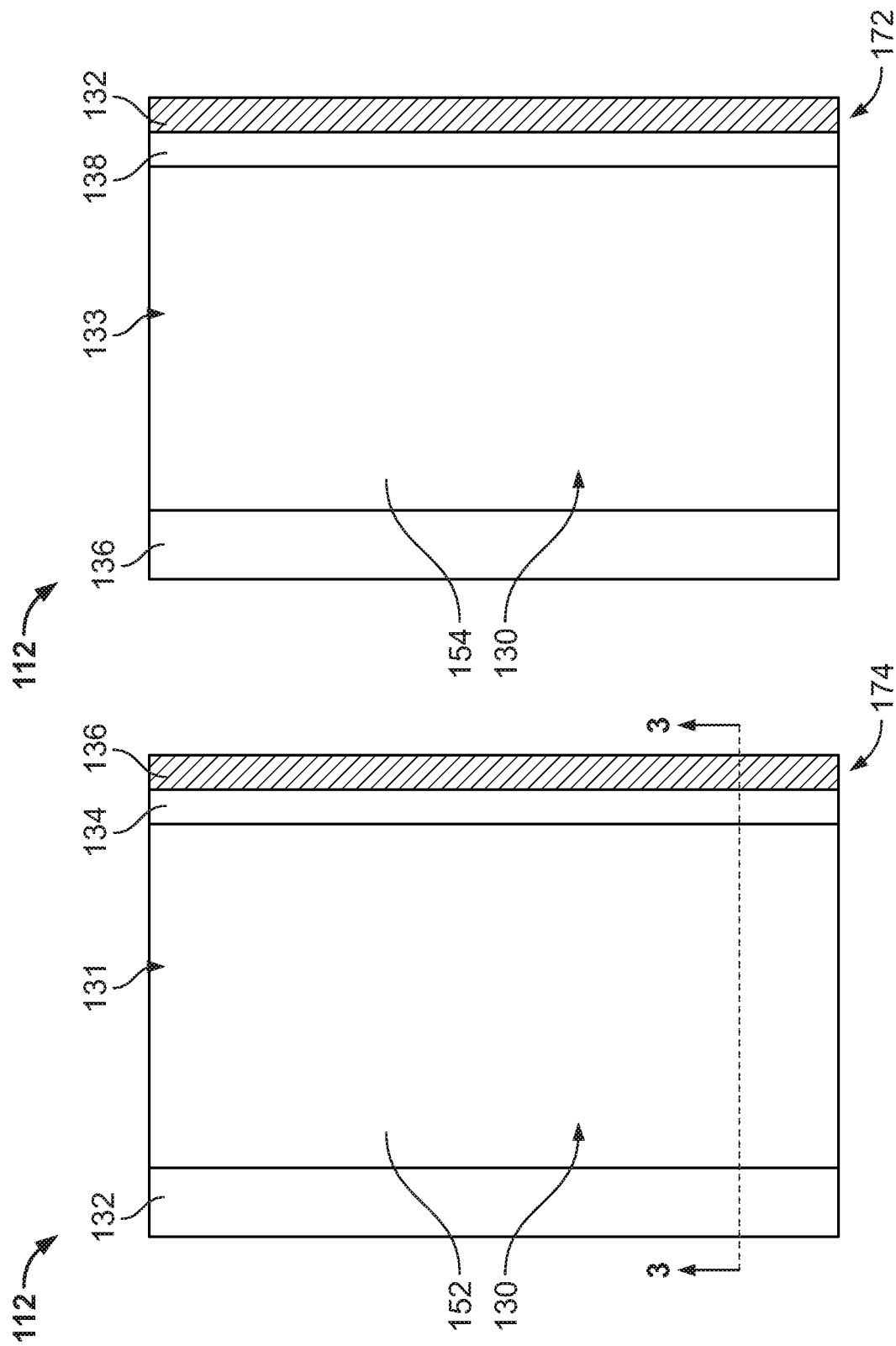
FIG. 2A is side view of one of the composite panels of FIG. 1.
FIG. 2B is an opposite side view of the composite panel of FIG. 2A.
Figure 3:
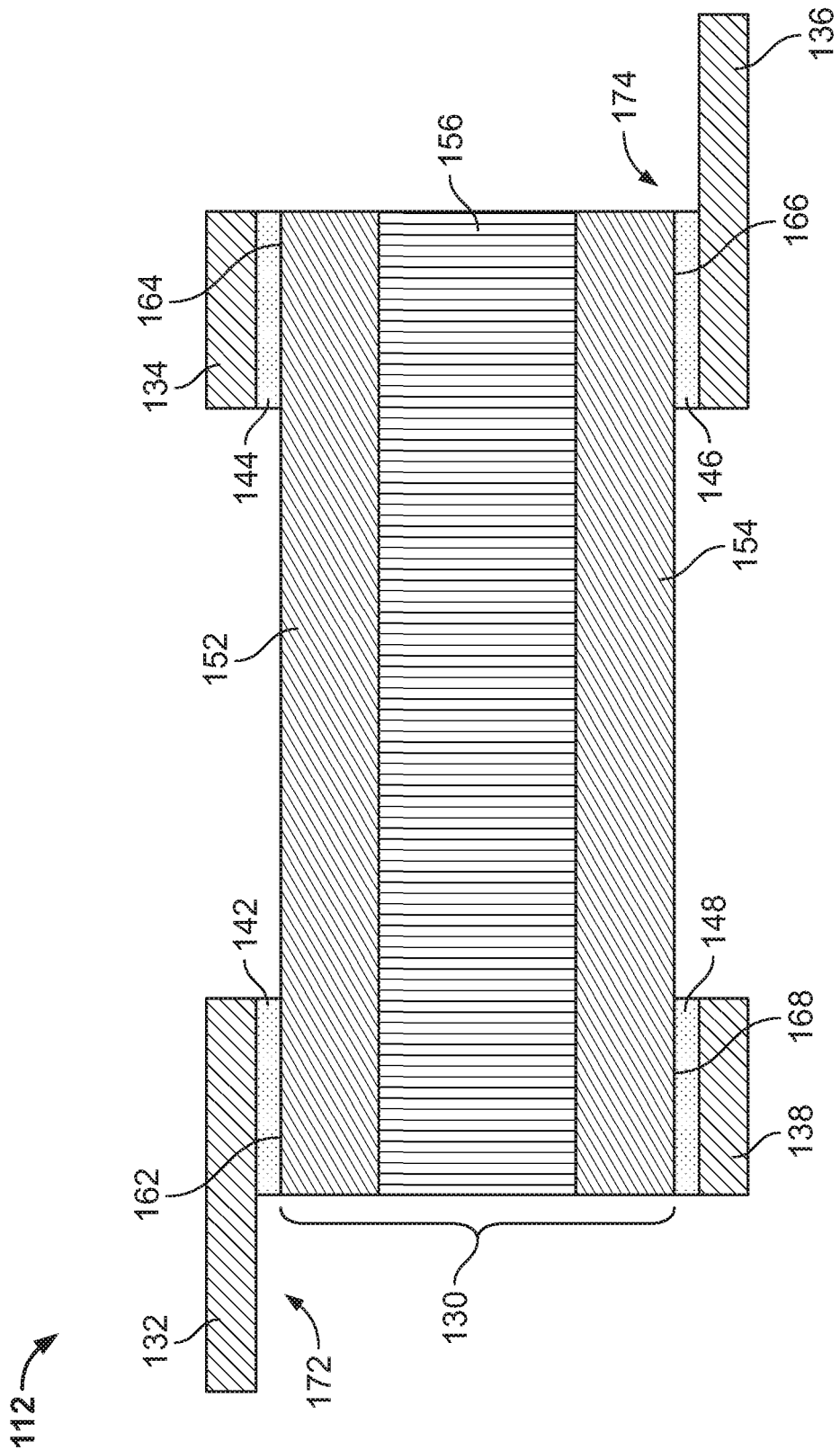
FIG. 3 is a cross-sectional view of the composite panel of FIGS. 1, 2A, and 2B taken along line 3-3 of FIG. 2A.

FIGS. 2A, 2B, and 3 illustrate a first side 131 of a composite panel 112, an opposite second side 133 of the composite panel 112, and a cross-section of the composite panel 112, respectively, according to some embodiments. As shown in FIGS. 2A-3, the composite panel 112 may include a composite assembly 130 and one or more connecting strips 132-138. More specifically, as shown in FIG. 2A, the composite panel 112 may include a first connecting strip 132 and a second connecting strip 134 disposed on the first side 131 of the panel 112 and coupled (e.g., bonded) to the composite assembly 130. As shown in FIG. 2B, the composite panel 112 may further include a third connecting strip 136 and a fourth connecting strip 138 disposed on the second side 133 of the panel 112 and coupled to the composite assembly 130. In some embodiments, one or more of the first connecting strip 132, the second connecting strip 134, the third connecting strip 136, and the fourth connecting strip 138 are metallic (e.g., steel, aluminum, etc.).

As shown in the cross-sectional view of FIG. 3, the composite assembly 130 can include a first skin 152, a second skin 154, and a core 156 disposed between and coupled to the first skin 152 and the second skin 154. The core 156 may be a partially hollow structure, for example, formed of a thermoplastic cell network. Example thermoplastics may include high-density polyethylene (HDPE), polypropylene (PP), or the like. In some embodiments, the thermoplastic cell network may include a plurality of hexagonal cells that are substantially hollow. In other embodiments, the thermoplastic cell network may include a cell network of polygonal, arcuate, and/or sinusoidal cells that are substantially hollow. Furthermore, in some embodiments, the first skin 152 and/or the second skin 154 are formed from a polymer such as glass-reinforced plastic (GRP), fiber-reinforced plastic, etc. Plastics used in GRP can include, for example, polypropylene, high density polyethylene, etc. Additionally, in other embodiments, the first skin 152 and/or the second skin 154 are formed from other materials including, for example, bioplastics, wood, thermoplastic, polymers, and other materials. In some embodiments, the core 156 is bonded to the first skin 152 and the second skin 154. For example, in one embodiment, the core 156 may be thermally welded to the first skin 152 and the second skin 154.

Furthermore, the composite assembly 130 may be bonded to the connecting strips 132, 134, 136, 138. More specifically, as shown in FIG. 3, the first skin 152 can include a first bonding region 162 and a second bonding region 164. The second skin 154 can include a third bonding region 166 and fourth bonding region 168. The composite panel 112 further includes a first adhesive layer 142, a second adhesive layer 144, a third adhesive layer 146, and a fourth adhesive layer 148. In some embodiments, the first adhesive layer 142, the second adhesive layer 144, the third adhesive layer 146, and the fourth adhesive layer 148 may include a first type of adhesive suitable for joining metals (i.e., of the connecting strips 132-138) to polymers (i.e., of the skins 152, 154). For example, this first type of adhesive may include resins, epoxies, silicones or other adhesives suitable for joining metals to polymers.

Referring still to FIG. 3, the first adhesive layer 142 is disposed between the first skin 152 and the first connecting strip 132 at the first bonding region 162. Thus, the first adhesive layer 142 can couple (e.g., bond) the first connecting strip 132 to the first skin 152 at the first bonding region 162. Similarly, the second adhesive layer 144 is provided between the first skin 152 and the second connecting strip 134 at the second bonding region 164. Thus, the second adhesive layer 144 can couple the second connecting strip 134 to the first skin 152 at the second bonding region 164. The third adhesive layer 146 is between the second skin 154 and the third connecting strip 136 at the third bonding region 166. Thus, the third adhesive layer 146 can couple the third connecting strip 136 to the second skin 154 at the third bonding region 166. Further, the fourth adhesive layer 148 is between the second skin 154 and the fourth connecting strip 138 at the fourth bonding region 168. Thus, the fourth adhesive layer 148 can couple the fourth connecting strip 138 to the second skin 154 at the fourth bonding region 168.

Generally, in some embodiments, the bonding regions 162-168 and, thus, the connecting strips 132-138 may be located along lateral edges of the composite assembly 130. With reference to the composite panel 112 as part of a wall assembly of the tractor trailer assembly 100 of FIG. 1, these lateral edges may correspond to fore and aft edges (e.g., a fore edge facing toward the front of the trailer 102, and a rear edge facing toward the rear of the trailer 102). However, it should be understood that, in some embodiments, the lateral edges of the composite assembly 130 may instead correspond to top and bottom edges.

In some embodiments, the connecting strips 132-138 may each have a width between about two inches to about four inches. Additionally, the connecting strips 132-138 may each have a thickness between about 0.009 inches to about 0.0016 inches. Furthermore, some connecting strips 132-138 may be wider than others. For example, as shown in FIGS. 2A, 2B, and 3, a portion of the first connecting strip 132 and the third connecting strip 136 can be sized and positioned to each extend laterally away from a respective edge of the composite assembly 130. Looking specifically at FIG. 3, the first connecting strip 132 and the composite assembly 130 thus define a first overhang 172. Similarly, the third connecting strip 136 and the composite assembly 130 thus define a second overhang 174. These overhangs 172, 174 can facilitate coupling together adjacent composite panels 112.

Figure 4:
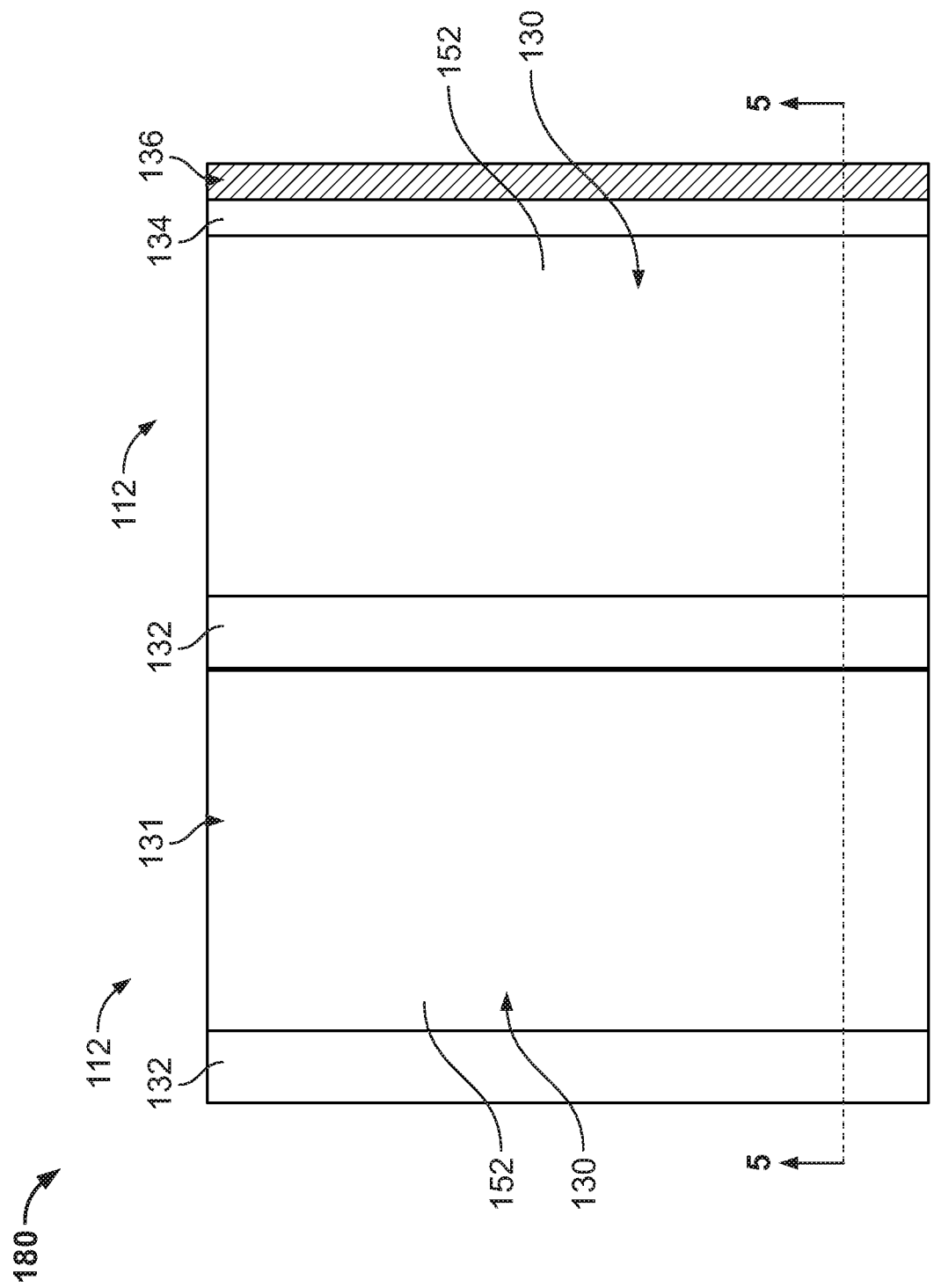
FIG. 4 is a side view of a wall assembly including a plurality of the composite panels of FIGS. 1-3 joined together.
Figure 5:
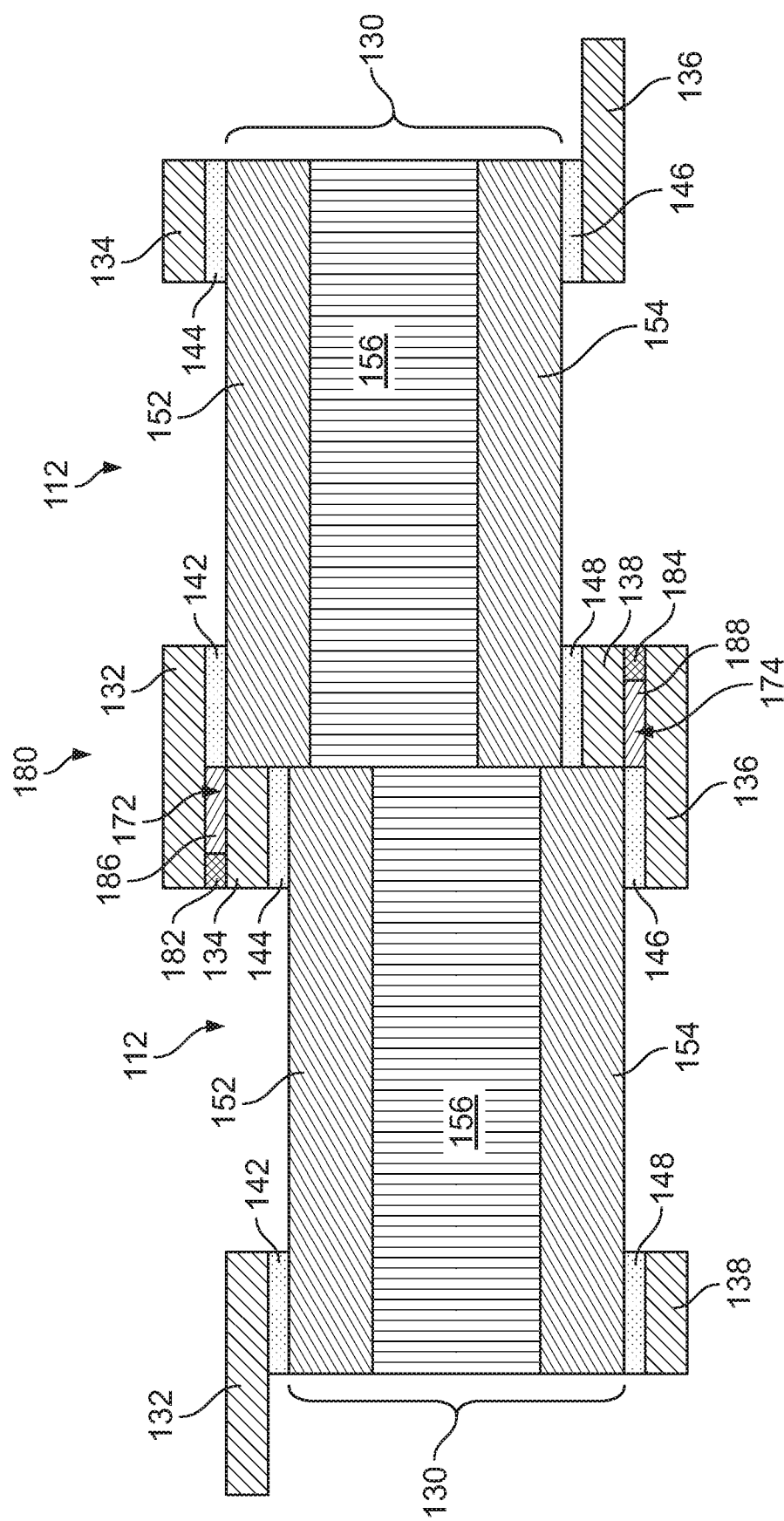
FIG. 5 is a cross-sectional view of the wall assembly taken along line 5-5 of FIG. 4.

For example, FIGS. 4 and 5 illustrate a wall assembly 180 including two or more composite panels 112 joined together. Looking specifically at FIG. 5, the wall assembly 180 may also include a first tape layer 182, a second tape layer 184, a fifth adhesive layer 186, and a sixth adhesive layer 188. In some embodiments, the fifth adhesive layer 186 and the sixth adhesive layer 188 may include a second type of adhesive suitable for joining metals (i.e., of the connecting strips 132-138) to one another. In one example, this second type of adhesive may include an acrylate-based adhesive for joining metals to metals. Additionally, this second type of adhesive may be different than the first type of adhesive described above for joining metals to polymers.

As shown in FIG. 5, when the adjacent composite panels 112 are joined, the second connecting strip 134 of one panel 112 can engage (e.g., nest, occupy, lodge into, etc.) a neighboring first overhang 172 of an adjacent panel 112. Thus, in the wall assembly 180, the first connecting strips 132 overlap the second connecting strips 134 of adjacent panels 112. The first tape layer 182 can be positioned between the first connecting strip 132 and the second connecting strip 134 of neighboring composite panels 112. Furthermore, the fifth adhesive layer 186 can be positioned between the first connecting strip 132 and the second connecting strip 134 of neighboring composite panels 112. The fifth adhesive layer 186 can bond the first connecting strip 132 and the second connecting strip 134 together, and the first tape layer 182 can be designed to sealingly retain the fifth adhesive layer 186 between the first tape layer 182 and the first adhesive layer 142.

Looking still at FIG. 5, similarly, when the neighboring composite panels 112 are joined, the fourth connecting strips 138 engage neighboring second overhangs 174. Thus, in the wall assembly 180, the third connecting strips 136 overlap the fourth connecting strips 138. The second tape layer 184 can be positioned between the third connecting strip 136 and the fourth connecting strip 138 of neighboring composite panels 112. The sixth adhesive layer 188 can be positioned between the third connecting strip 136 and the fourth connecting strip 138 of neighboring composite panels 112. The sixth adhesive layer 188 can bond the third connecting strip 136 and the fourth connecting strip 138 together, and the second tape layer 184 can sealingly retain the sixth adhesive layer 188 between the second tape layer 184 and the third adhesive layer 146.

Accordingly, as shown in the FIG. 5, the joined composite panels 112 of the wall assembly 180 are shingled (e.g., stepped, tiered, overlaid, overhung, shiplapped, etc.) relative to one another. However, it should be understood that FIGS. 1-5 (and FIGS. 6-13, further described below) are not to scale. The thicknesses and/or sizes of the various layers shown in FIGS. 1-13 are exaggerated to more clearly demonstrate their relative placements. Thus, the shingled offset between the composite panels 112 shown in FIG. 5 is also exaggerated. Accordingly, in some embodiments, the skins 152, 154, adhesives 142-148, 186-188, retaining tapes 182, 184, and connecting strips 132-138 can be relatively thin as compared to the core 156. As a result, in such embodiments, the sidewall 106, the front end wall assembly 108, the roof assembly 110, the floor assembly, and/or the rear end wall assembly of the trailer 102 made from the composite panels 112 shown in FIG. 1 may be relatively planar.

Additionally, in some embodiments, the first and second skins 152, 154 may be coined or offset (not shown) to accommodate the skins 152, 154, adhesives 142-148, 186-188, retaining tapes 182, 184, and connecting strip layers 132-138 to produce generally flat joints rather than a shingled configuration. Thus, in such embodiments, the sidewall 106, the front end wall assembly 108, the roof assembly 110, the floor assembly, and/or the rear end wall assembly of the trailer 102 made from the composite panels 112 shown in FIG. 1 are generally planar and substantially flat.

Generally, the composite assembly 130 of the panel 112, comprising the plastic skins 152, 154 on a partially hollow core 156, is substantially lightweight compared to, for example, solid core and/or metal-skinned panels. However, the low surface energy of the plastic skins can make attaching these types of panels to one another or to metal components such as rails or logistics hardware difficult in some applications. According to some embodiments, the metallic connecting strips 132-138 can strengthen the connections between the composite panels 112 and other panels 112 or between the composite panels 112 and other metal components, such as rails or logistics hardware. That is, the connections can be strengthened by using a first type of adhesive to couple the connecting strips 132-138 to the plastic skins 152, 154 (i.e., one that is suitable for joining metals to polymers), and a second type of adhesive to couple the connecting strips 132-138 to each other or to other metal components (i.e., one that is suitable for joining metals together). This configuration of some embodiments can provide improved structural properties for the composite panels 112, such as improved fracture resistance and resistance to delamination.

With reference to FIGS. 6A, 6B, and 7, another composite panel 212, according to some embodiments, is shown. It should be understood that the composite panel 212 may be a variation on the composite panel 112 of FIGS. 1-5. Thus, the composite panel 212 may include any or all the features of the composite panel 112 discussed above in conjunction with FIGS. 1-5. Accordingly, the composite panel 212 may include a composite assembly 130 (with a first skin 152, a second skin 154, and a core 156), a first connecting strip 132, a second connecting strip 134, a third connecting strip 136, a fourth connecting strip 138, a first adhesive layer 142, a second adhesive layer 144, a third adhesive layer 146, and a fourth adhesive layer 148.

As shown in FIGS. 6A and 6B, the composite panel 212 may further include a fifth connecting strip 220 and a sixth connecting strip 222 disposed on a first side 131 of the panel 212 and coupled to the composite assembly 130, and a seventh connecting strip 224 and an eighth connecting strip 226 disposed on a second side 133 of the panel 212 and coupled to the composite assembly 130. The fifth connecting strip 220 and the sixth connecting strip 222 may extend between the first connecting strip 132 and the second connecting strip 134 on the first side 131. Additionally, the fifth connecting strip 220 and the sixth connecting strip 222 may be positioned opposite one another along either end of the composite panel 212. Similarly, the seventh connecting strip 224 and the eighth connecting strip 226 may extend between the third connecting strip 136 and the fourth connecting strip 138 on the second side 133. The seventh connecting strip 224 and the eighth connecting strip 226 may be positioned opposite one another along either end of the composite panel 212. In some embodiments, the fifth connecting strip 220, the sixth connecting strip 222, the seventh connecting strip 224, and the eighth connecting strip 226 are metallic (e.g., steel, aluminum, etc.).

In other words, the composite panel 212 is similar to the composite panel 112, further including the fifth connecting strip 220, the sixth connecting strip 222, the seventh connecting strip 224, and the eighth connecting strip 226 on opposite ends of the panel 212, as shown in FIGS. 6A and 6B.

With reference to FIG. 7, the composite panel 212 may also include a seventh adhesive layer 242 and an eighth adhesive layer 244. Furthermore, the first skin 152 may have a fifth bonding region 262, and the second skin 154 may have a sixth bonding region 264. In some embodiments, the seventh adhesive layer 242 and the eighth adhesive layer 244 may be provided as a first type of adhesive suitable for joining the first skin 152 and second skin 154 (e.g., polymers) to the sixth connecting strip 222 and the seventh connecting strip 224 (e.g., metals), respectively.

More specifically, referring still to FIG. 7, the seventh adhesive layer 242 is positioned between the first skin 152 and the sixth connecting strip 222 at the fifth bonding region 262. The seventh adhesive layer 242 is further positioned between the first adhesive layer 142 and the second adhesive layer 144. Thus, the seventh adhesive layer 242 bonds the sixth connecting strip 222 to the first skin 152 at the fifth bonding region 262. It should be understood that the fifth connecting strip 220 is bonded to the first skin 152 via another adhesive layer (not shown) in the same manner as the sixth connecting strip 222 is bonded to the first skin 152.

Referring still to FIG. 7, similarly, the eighth adhesive layer 244 is positioned between the second skin 154 and the eighth connecting strip 226 at the sixth bonding region 264. The eighth adhesive layer 242 is further positioned between the third adhesive layer 146 and the fourth adhesive layer 148 on the opposing side of the panel 112. Thus, the eighth adhesive layer 244 bonds the eighth connecting strip 226 to the second skin 154 at the sixth bonding region 264. It should be understood that the seventh connecting strip 224 is bonded to the second skin 154 via another adhesive layer (not shown) in the same manner as the eighth connecting strip 226 is bonded to the second skin 154.

Figure 8:
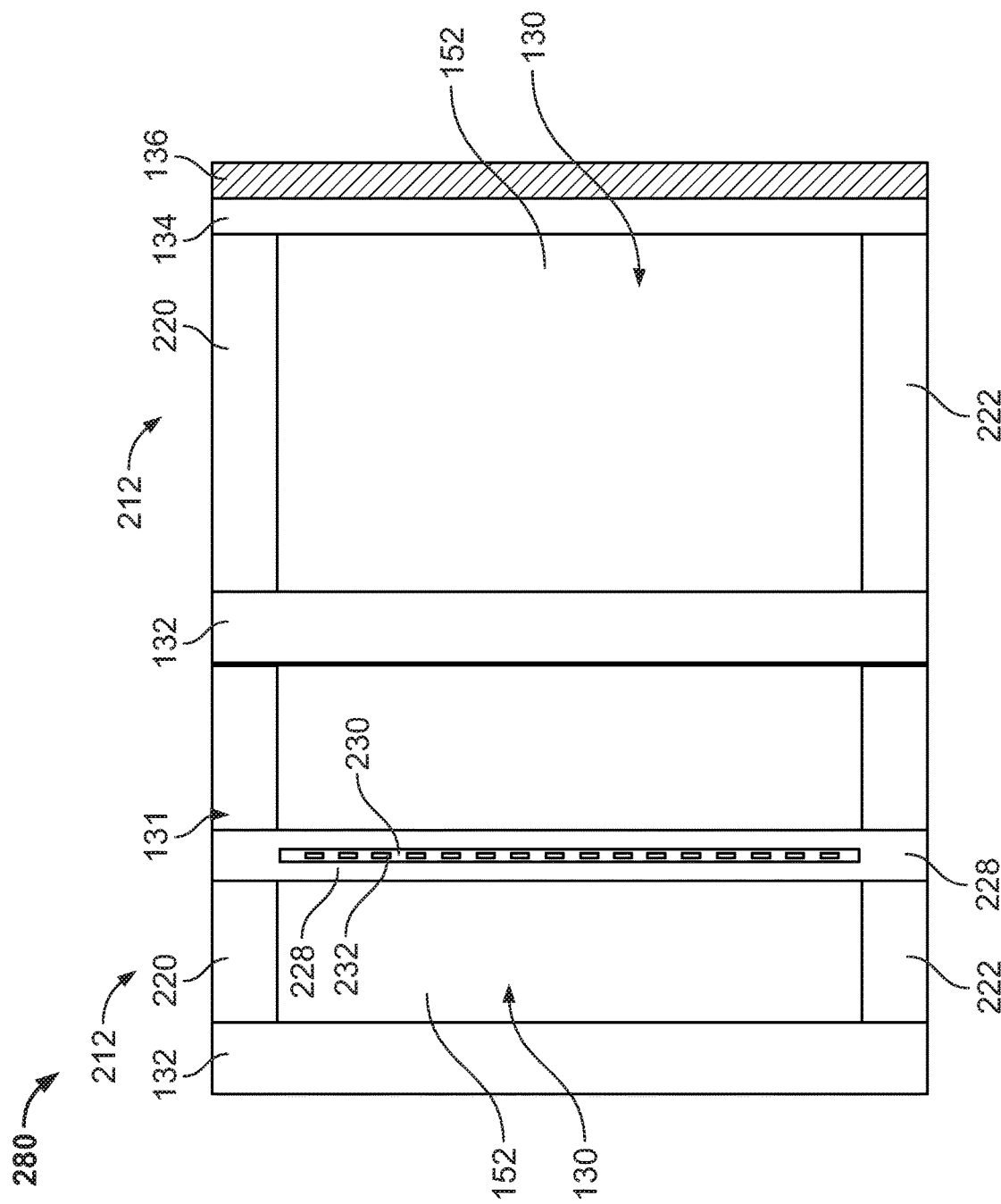
FIG. 8 is a side view of a wall assembly including a plurality of the composite panels of FIGS. 6A-7 joined together.

Looking at FIGS. 5 and 7, it should be understood that two or more composite panels 212 may be joined with one another in the same manner as the composite panels 112 to create a wall assembly similar to wall assembly 180 of FIG. 5. In other words, as shown in FIG. 8, two or more composite panels 212 may be engaged in a shingled arrangement and joined via the fifth adhesive layer 186, the sixth adhesive layer 188, the first tape layer 182, and the second tape layer 184 in the same manner as shown in FIG. 5 with respect to the composite panels 112 to form a wall assembly 280. Further, in some embodiments, a composite panel 112 may be joined with a composite panel 212 via the fifth adhesive layer 186 and the sixth adhesive layer 188 of FIG. 5. In other words, the composite panels 112 may be joinably compatible with the composite panels 212.

Generally, in some embodiments, the connecting strips 132-138, 220-226 of the composite panel 212 may be located along lateral edges of the composite assembly 130. With reference to the composite panel 212 as part of a wall assembly of the tractor trailer assembly 100 of FIG. 1, the connecting strips 132-138 may be located along fore and aft edges, while the connecting strips 220-226 may be located along top and bottom edges of the panel 212. Additionally, while the composite panel 212 is shown and described herein as comprising eight connecting strips (i.e., located along all four edges of either side of the composite assembly 130), it should be noted that the composite panel 212, or any of the composite panels described herein, may have any combination of one to eight or more connecting strips, located along one or more edges of one or more sides. By way of example, a composite panel 212 of a wall assembly of a trailer 102 may include a connecting strip 226 along an outside bottom edge of the panel 212 to facilitate coupling the composite panel 212 to a base rail 120 (or other rail) of the trailer 102, but may not need a connecting strip 222 along an inside bottom edge of the panel 212.

Furthermore, in some embodiments, the composite panel 212 (or any other composite panel described herein) may include one or more connecting strips along one or more edges of the composite assembly 130, or one or more interior surfaces of the composite assembly 130 (that is, surfaces interior relative to the edges). By way of example, one of the composite panels 212 of the wall assembly 280 of FIG. 8 includes a ninth connecting strip 228 positioned vertically along an interior surface of the composite assembly 130, such as down the middle of the of composite assembly 130 between fore and aft edges. However, in other embodiments, one or more connecting strips may be positioned horizontally along the interior surface of the composite assembly 130 between upper and lower edges.

In some embodiments, an interior connecting strip 228 (or any edge connecting strip) can serve as a bonding surface for a logistics assembly of a trailer. For example, a typical logistics assembly for a trailer or other storage container may include a logistics plate bonded to an inside skin of a composite panel and a splice plate bonded to an opposite outside skin of the composite panel, where the logistics plate and the splice plate are further riveted together through the panel. The logistics plate may then serve as an anchor post for materials within the trailer. More specifically, the logistics plate may include one or more apertures, or logistics slots, that align with apertures extending through the panel, and clips, hooks, or other restraining equipment may be engaged with the logistics slots to help secure cargo within the trailer.

Accordingly, in some embodiments, as shown in FIG. 8, a logistics plate 230 including one or more logistics slots 232 may be bonded to the interior connecting strip 228 on one side 131 of the panel 212. The logistics plate 230 may be bonded to the interior connecting strip 228, for example, using the second type of adhesive for metal to metal bonding and/or a tape (e.g., similar to the metal to metal connections shown in FIG. 5). Furthermore, in some embodiments, a splice plate (not shown) may be bonded to an interior connecting strip on an opposite side 133 of the panel 212, and further coupled to the logistics plate 230 through the composite assembly 130. In such embodiments, the logistics plate 230 and the splice plate form a logistics assembly. However, in other embodiments, only the logistics plate 230 forms the logistics assembly (i.e., there is no splice plate on the opposite side of the panel 212). Additionally, in some embodiments, the interior connecting strip 228 and panel 212 may also include apertures (not shown) that align with the logistics slots 232.

Figure 9B:
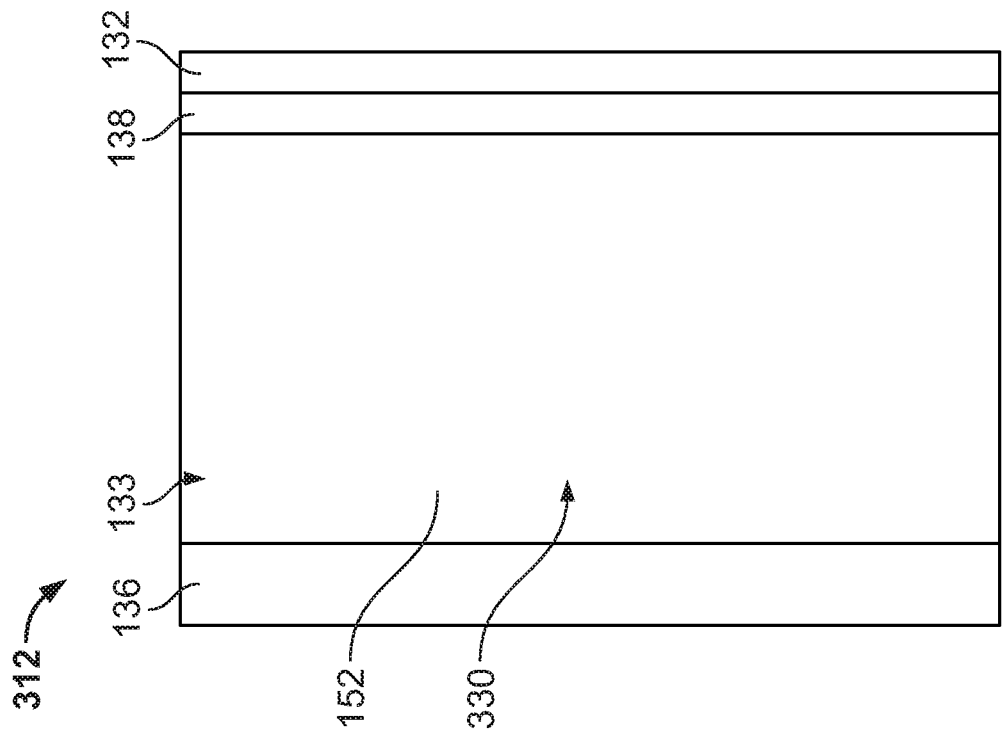
FIG. 9B is an opposite side view of the composite panel of FIG. 9A.
Figure 9A:
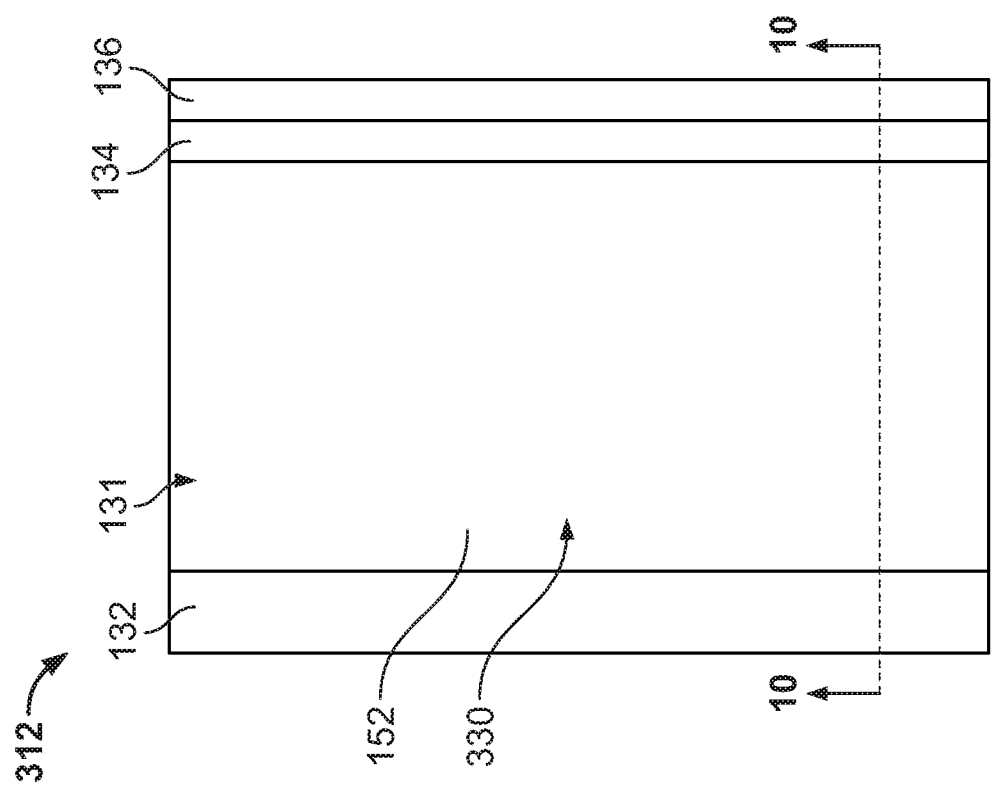
FIG. 9A is a side view of a composite panel, according to some embodiments.
Figure 10:
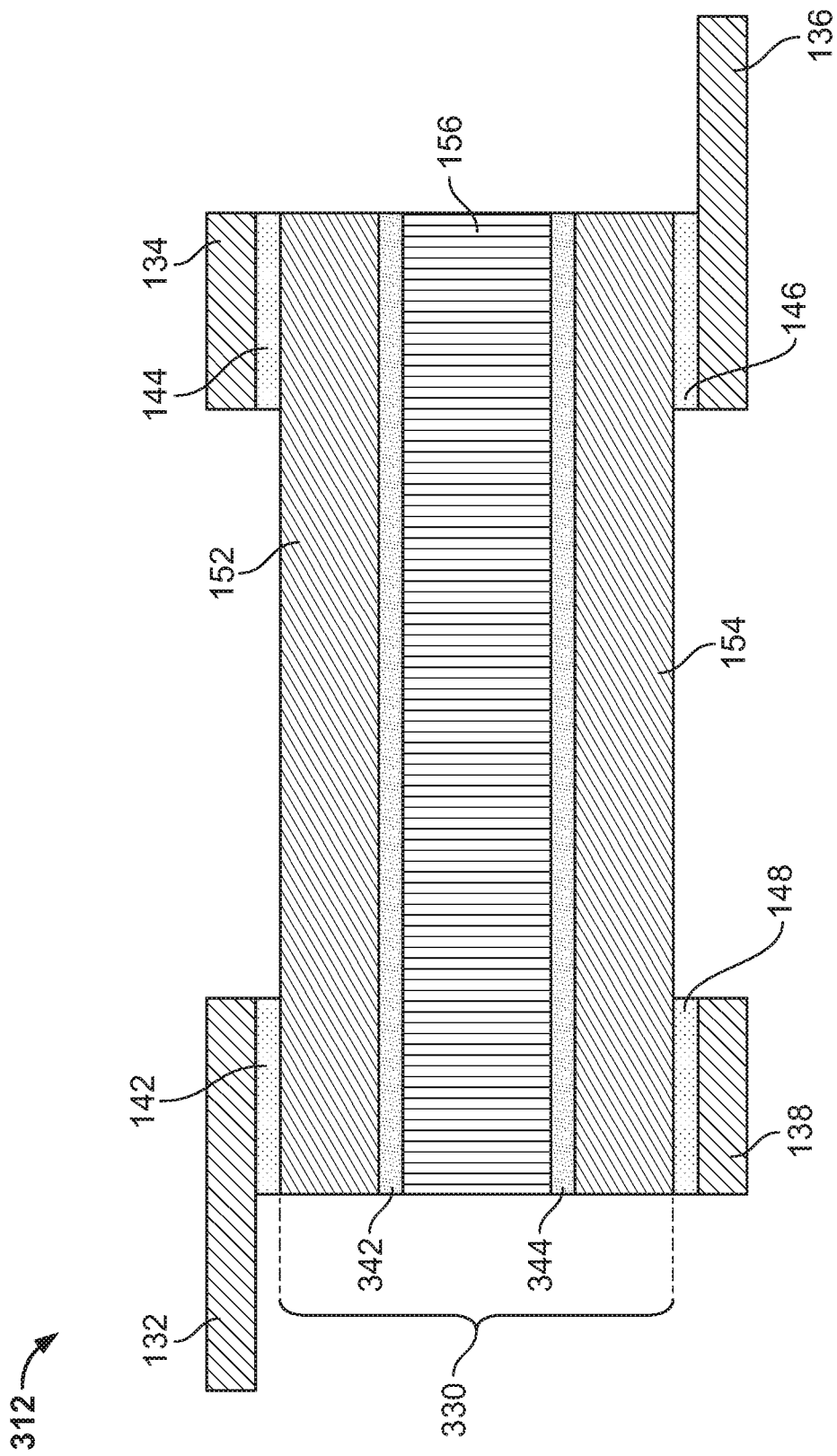
FIG. 10 is a cross-sectional view of the composite panel of FIGS. 9A and 9B taken along line 10-10 of FIG. 9A.

With reference to FIGS. 9A, 9B, and 10, yet another composite panel 312, according to some embodiments, is shown. It should be understood that the composite panel 312 is a variation on the composite panel 112 of FIGS. 1-5. Thus, the composite panel 312 may include any or all the features of the composite panel 112 discussed above in conjunction with FIGS. 1-5. Accordingly, the composite panel 312 may include a first connecting strip 132, a second connecting strip 134, a third connecting strip 136, a fourth connecting strip 138, a first adhesive layer 142, a second adhesive layer 144, a third adhesive layer 146, and a fourth adhesive layer 148.

Furthermore, as shown in FIG. 10, the composite panel 312 may include a composite assembly 330 including a first skin 152, a second skin 154, and a core 156 disposed between the first skin 152 and the second skin 154. The composite assembly 330 also includes an eleventh adhesive layer 342 and a twelfth adhesive layer 344. In some embodiments, the eleventh adhesive layer 342 and the twelfth adhesive layer 344 are provided in the form of an adhesive suitable for joining polymers to one another. The eleventh adhesive layer 342 is provided between the first skin 152 and the core 156. Thus, the eleventh adhesive layer 342 bonds the first skin 152 to the core 156. The twelfth adhesive layer 344 is provided between the second skin 154 and the core 156. Thus, the twelfth adhesive layer 344 bonds the second skin 154 to the core 156.

Looking still at FIG. 10, the first connecting strip 132 and the second connecting strip 134 are respectively bonded to the first skin 152 via the first adhesive layer 142 and the second adhesive layer 144 in the same manner as shown in FIG. 3 with respect to the composite panel 112. Similarly, the third connecting strip 136 and the fourth connecting strip 138 are respectively bonded to the second skin 154 via the third adhesive layer 146 and the fourth adhesive layer 148 in the same manner as shown in FIG. 3 with respect to the composite panel 112.

Looking at FIGS. 5 and 10, it should be understood that two or more composite panels 312 may be joined with one another in the same manner as the composite panels 112 to create a wall assembly similar to wall assembly 180 of FIG. 5. In other words, two or more composite panels 312 may be engaged in a shingled arrangement and joined via the fifth adhesive layer 186, the sixth adhesive layer 188, the first tape layer 182, and the second tape layer 184 in the same manner as shown in FIG. 5. Further, a composite panel 112 may be joined with a composite panel 312 via the fifth adhesive layer 186, the sixth adhesive layer 188, the first tape layer 182, and the second tape layer 184 of FIG. 5. Additionally, a composite panel 212 may be joined with a composite panel 312 via the fifth adhesive layer 186, the sixth adhesive layer 188, the first tape layer 182, and the second tape layer 184 of FIG. 5. In other words, the composite panels 112, the composite panels 212, and the composite panels 312 are joinably compatible with one another in any combination.

Figure 12:
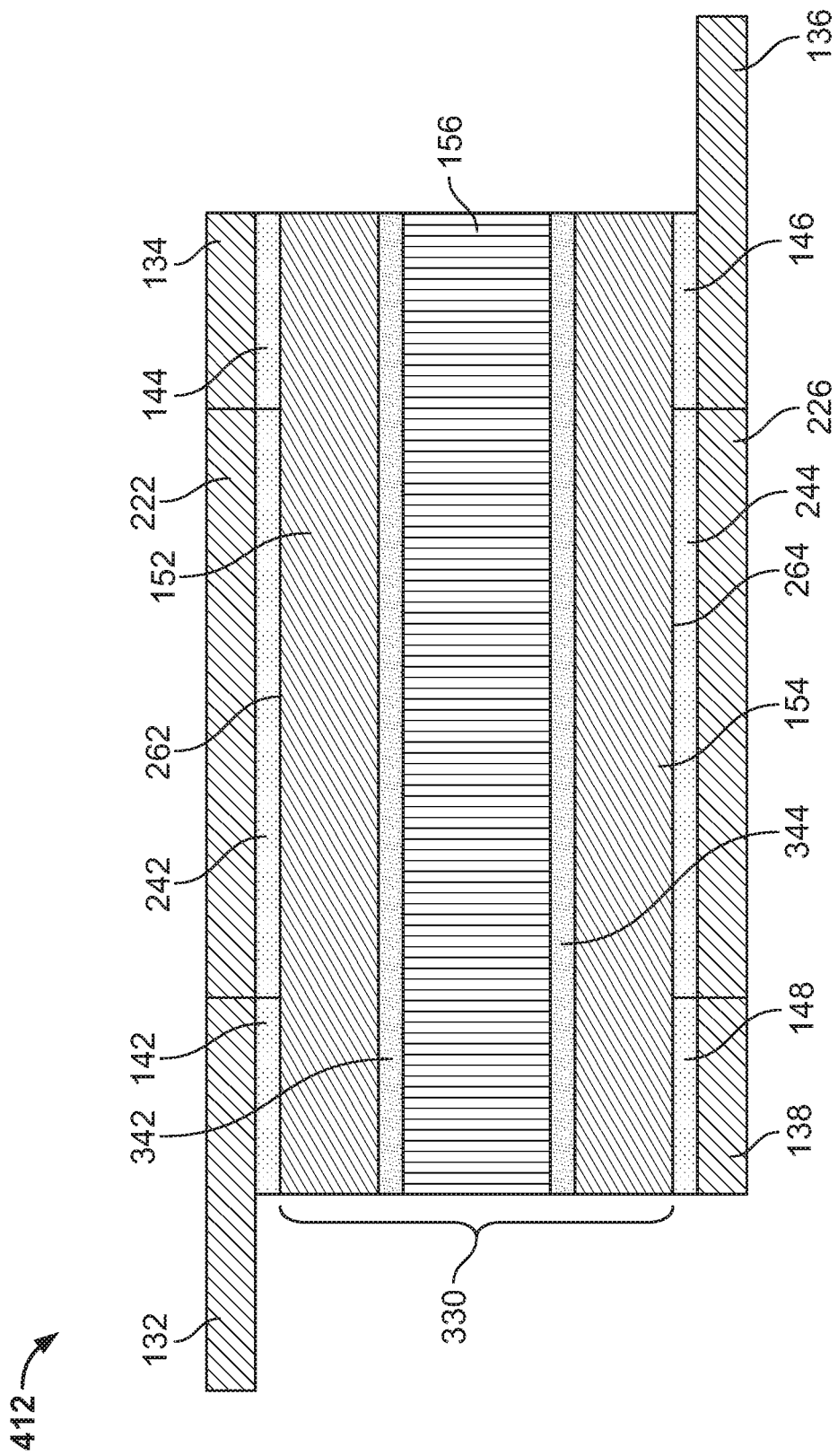
FIG. 12 is a cross-sectional view of the composite panel of FIGS. 11A and 11B taken along line 12-12 of FIG. 11A.

With reference to FIGS. 11A, 11B, and 12, yet another composite panel 412, according to some embodiments, is shown. It should be understood that the composite panel 412 is a variation on the composite panel 312 of FIGS. 9A, 9B, and 10. Thus, the composite panel 412 may include any or all the features of the composite panel 312 discussed above in conjunction with FIGS. 9A, 9B, and 10. Accordingly, the composite panel 412 may include a composite assembly 330 (with a first skin 152, a second skin 154, a core 156, an eleventh adhesive layer 342 and a twelfth adhesive layer 344), a first connecting strip 132, a second connecting strip 134, a third connecting strip 136, a fourth connecting strip 138, a first adhesive layer 142, a second adhesive layer 144, a third adhesive layer 146, and a fourth adhesive layer 148.

Referring to FIGS. 11A and 11B, the composite panel 412 may further include a fifth connecting strip 220 and a sixth connecting strip 222 disposed on a first side 131 of the panel 412 and coupled to the composite assembly 330, and a seventh connecting strip 224 and an eighth connecting strip 226 disposed on a second side 133 of the panel 412 and coupled to the composite assembly 330. The fifth connecting strip 220, the sixth connecting strip 222, the seventh connecting strip 224, and the eighth connecting strip 226 may be arranged on the composite panel 412 in the same manner as shown in FIGS. 6A-6B with respect to the composite panel 212.

With reference to FIG. 12, the composite panel 412 also includes the seventh adhesive layer 242 and the eighth adhesive layer 244. The seventh adhesive layer 242 bonds the sixth connecting strip 222 to the composite assembly 330 in the same manner as shown in FIG. 7 with respect to the composite panel 212. The eighth adhesive layer 244 bonds the eighth connecting strip 226 to the composite assembly 330 in the same manner as shown in FIG. 7 with respect to the composite panel 212.

In other words, the composite panel 412 is similar to the composite panel 312, further including the fifth connecting strip 220, the sixth connecting strip 222, the seventh connecting strip 224, and the eighth connecting strip 226 on opposite ends of the panel 412, as shown in FIGS. 11A, 11B, and 12.

Looking at FIGS. 5 and 12, it should be understood that two or more composite panels 412 may be joined with one another in the same manner as the composite panels 112 to create a wall assembly similar to the wall assembly 180 of FIG. 5. In other words, two or more composite panels 412 may be engaged in a shingled arrangement and joined via the fifth adhesive layer 186, the sixth adhesive layer 188, the first tape layer 182, and the second tape layer 184 in the same manner as shown in FIG. 5. Further, a composite panel 112 may be joined with a composite panel 412 via the fifth adhesive layer 186, the sixth adhesive layer 188, the first tape layer 182, and the second tape layer 184 of FIG. 5. Additionally, a composite panel 212 may be joined with a composite panel 412 via the fifth adhesive layer 186, the sixth adhesive layer 188, the first tape layer 182, and the second tape layer 184 of FIG. 5. Moreover, a composite panel 312 may be joined with a composite panel 412 via the fifth adhesive layer 186, the sixth adhesive layer 188, the first tape layer 182, and the second tape layer 184 of FIG. 5. In other words, the composite panels 112, the composite panels 212, the composite panels 312, and the composite panels 412 are joinably compatible with one another in any combination.

Figure 13:
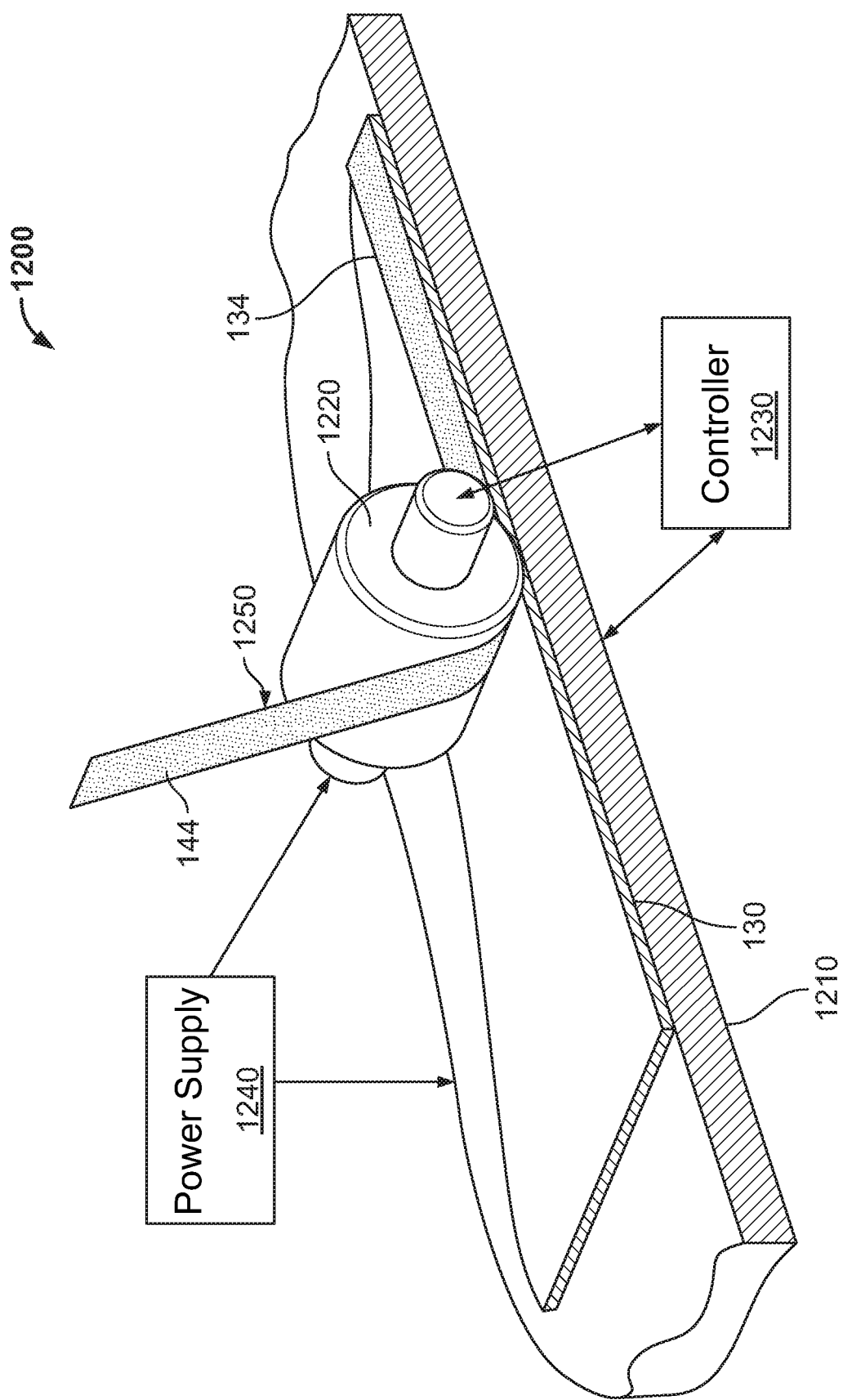
FIG. 13 is a schematic view of a connecting strip and composite panel laminating system.

In some embodiments, the composite panels 112, 212, 312, 412 may be constructed using equipment in a production line. For example, FIG. 13 illustrates a laminating system 1200 capable of constructing the composite panels 112, 212, 312, 412 in accordance with some embodiments. With reference to FIG. 13, the laminating system 1200 may include a conveyor 1210, a laminator 1220, a controller 1230, and a power supply 1240. The controller 1230 is in communication with the conveyor 1210 and the laminator 1220. For example, communication between the controller 1230, the conveyor 1210, and the laminator 1220 may be wired or wireless. The power supply 1240 is in communication with the conveyor 1210 and the laminator 1220. The laminator 1220 is configured to heat using electrical energy provided from the power supply 1240. In FIG. 13, the laminator 1220 is depicted as a roller. However, it should be understood that the laminator 1220 may be any type of heatable press (e.g., a handheld iron, a belt press, a clamping press, etc.) in other embodiments.

Referring still to FIG. 13, in operation, the controller 1230 commands the conveyor 1210 to advance the composite assembly 130 toward the laminator 1220. Further in operation, the controller 1230 commands the laminator 1220 to heat. Additionally, the second connecting strip 134 and the second adhesive layer 144 may be initially joined into a strip assembly 1250. When the laminator 1220 is heated and the composite assembly 130 has arrived at the laminator 1220, the strip assembly 1250 introduced between the laminator 1220 and the composite assembly 130 for lamination to the composite assembly 130. More specifically, the second adhesive layer 144 is introduced to contact and bond with the composite assembly 130. Additionally, the second connecting strip 134 is introduced to contact the laminator 1220. The second connecting strip 134 conducts heat from the laminator 1220 to the second adhesive layer 144. In operation, heat and pressure applied by the laminator 1220 activate the second adhesive layer 144 to bond the second connecting strip 134 to the composite assembly 130.

It should be understood that, while the laminating system 1200 is shown and described herein as bonding together the composite assembly 130, the second connecting strip 134, and the second adhesive layer 144, the laminating system 1200 may be used to bond any of the above-mentioned connecting strips to any of above-mentioned composite assemblies in the same manner as shown in FIG. 13.

Figure 14:
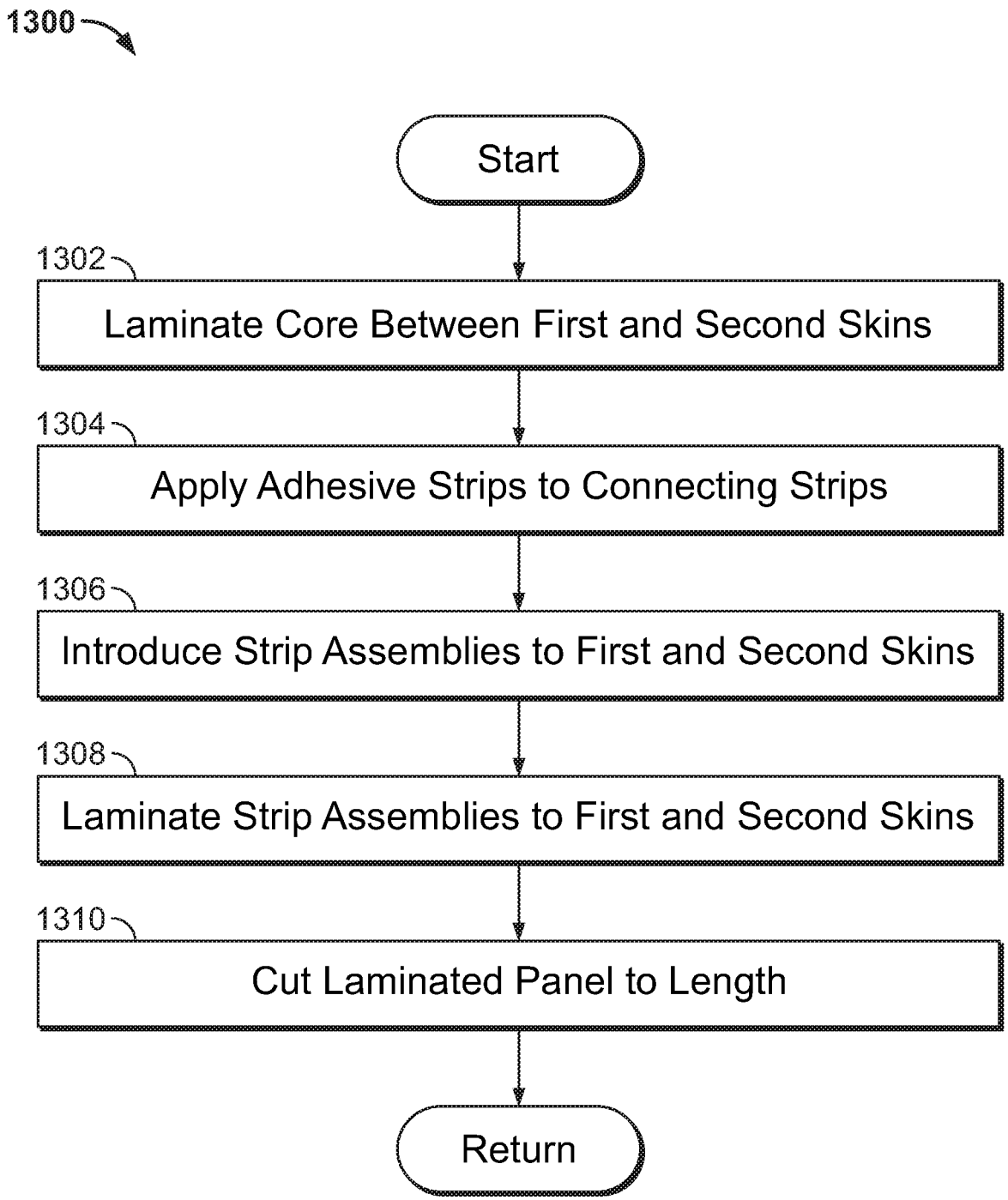
FIG. 14 is a flowchart of a method for producing composite panels according to some embodiments.

FIG. 14 is a flowchart of a method 1300 to produce composite panels such as the composite panels 112, 212, 312, 412 described above. The method 1300 may be at least partially implemented by the laminating system 1200 of FIG. 13. Accordingly, portions of the flowchart of FIG. 14 are representative of machine readable instructions stored in memory that comprise one or more programs that, when executed by the controller 1230, cause the laminating system 1200 to produce composite panels. Further, although the method 1300 is described with reference to the flowchart illustrated in FIG. 14, many other methods of producing composite panels may alternatively be used. For example, the order of execution of the blocks may be changed, and/or some of the blocks described may be changed, eliminated, or combined.

Initially, at block 1302, the core 156 is laminated to the first skin 152 and the second skin 154. In some embodiments, the core 156 is thermally welded directly to the first skin 152 and the second skin 154 as shown in FIGS. 3, 5, and 7. In some embodiments, the core 156 is adhered to the first skin 152 and the second skin 154 as shown in FIGS. 10 and 12 using an adhesive.

At block 1304, the adhesive layers (e.g., first, second, third, fourth, seventh, and eighth adhesive layers 142, 144, 146, 148, 242, 244) are applied to connecting strips (e.g., first, second, third, fourth, fifth, sixth, seventh, and eighth connecting strips 132, 134, 136, 138, 220, 222, 224, 226) to form strip assemblies (e.g., strip assembly 1250 shown in FIG. 13). This initial application may be completed by pre-heating the adhesive layers and applying the layers to the connecting strips via an adhesive dispenser.

At block 1306, the strip assemblies are introduced to the first and second skins. More specifically, the adhesive layers are put in contact with the first and second skins 152, 154, as shown in FIGS. 3, 5, 7, 10, and 12.

At block 1308, the strip assembles are laminated to the first and second skins 152, 154. More specifically, the laminator 1220 heats and compresses the adhesive layers against the skins 152, 154 to activate the adhesive layers and bond the connecting strips to the composite assembly.

At block 1310, the composite panel, with connecting strips, is cut to a predetermined length.

Accordingly, the system 1200 and method 1300 described above can provide a continuous lamination process for producing composite panels with connecting strips, cut to any desired length. In one embodiment, the predetermined length may be an entire length of a wall assembly of the trailer 102, such as the sidewall 106, the front end wall assembly 108, the roof assembly 110, the floor assembly, or the rear end wall assembly of the trailer 102. In other embodiments, the predetermined length may be a portion of the entire length of a wall assembly of the trailer 102. Additionally, in some embodiments, the system 1200 and method 1300 may be configured to produce composite panels in a discontinuous manner. Furthermore, in some embodiments, the system 1200 and/or method 1300 (or another system and/or method) may incorporate further components and steps to enable co-laminating the connecting strip(s), skins, and core in one step.

From the foregoing, it should be appreciated that the above disclosed apparatus and methods may provide additional fastening strength and/or other structural improvements. Specifically, the addition of metallic connecting strips to GRP-sheathed partially hollow cores provides advantageous connecting regions in composite panels to facilitate bonding connections. It should also be appreciated that the above disclosed composite panels are lighter than existing composite panels with metal skins. It should further be appreciated that the above disclosed metallic strip-reinforced composite panels may be readily formed to one another using existing tooling configured to join metallic sheathed partially hollow cores. Thus, because the above disclosed composite panels may be joined using existing tooling and are lighter than existing composite panels, widespread fuel economy of tractors pulling trailers formed of the composite panels may be improved.

Although the composite panels 112, 212, 312, 412 discussed herein have been discussed with respect to a tractor trailer application, it should be appreciated that the composite panels 112, 212, 312, 412, and/or any associated parts may be used in other applications where lightweight panels may be used, such as, for example, other automotive and transportation applications including truck bodies, aircraft cargo containers, marine applications, furniture applications, architecture applications and building materials, packing materials and logistics applications, aerospace applications, aerodynamic accessories used in tractor trailer applications (such as aerodynamic skirts, boat fins, tails, etc.), and the like. For example, the composite panels 112, 212, 312, 412, and/or any associated parts described herein are equally applicable to storage containers for vehicles such as conventional trailers (e.g., refrigerated freight trailers, flatbed trailers, commercial trailers, small personal trailers), truck bodies, and/or box or van semi-trailers, and the like, or standalone storage containers such as permanent or portable containers.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A composite panel for a storage container, comprising:
   a composite assembly comprising
      a first polymer skin,
      a second polymer skin, and
      a core disposed between the first polymer skin and the second polymer skin; and
   a metallic connecting strip bonded to the composite assembly,
   wherein the metallic connecting strip includes:
      a first metallic connecting strip bonded to a first edge of the first polymer skin,
      a second metallic connecting strip bonded to a second edge of the first polymer skin,
      a third metallic connecting strip bonded to a first edge of the second polymer skin,
      a fourth metallic connecting strip bonded to a second edge of the second polymer skin,
      a fifth metallic connecting strip bonded to a third edge of the first polymer skin between the first metallic connecting strip and the second metallic connecting strip,
      a sixth metallic connecting strip bonded to a fourth edge of the first polymer skin between the first metallic connecting strip and the second metallic connecting strip,
      a seventh metallic connecting strip bonded to a third edge of the second polymer skin between the third metallic connecting strip and the fourth metallic connecting strip, and
      an eighth metallic connecting strip bonded to a fourth edge of the second polymer skin between the third metallic connecting strip and the fourth metallic connecting strip.

2. The composite panel of claim 1, wherein the first metallic connecting strip extends laterally away from the composite assembly to define a first overhang.

3. The composite panel of claim 1, wherein the metallic connecting strip is bonded to the first polymer skin on an interior surface relative to a lateral edge of the first polymer skin.

4. The composite panel of claim 1, wherein the core is one of thermally welded to each of the first polymer skin and the second polymer skin, or coupled to each of the first polymer skin and the second polymer skin by an adhesive.

5. The composite panel of claim 1, wherein the core is a partially hollow structure comprising a cell network of substantially hollow cells.

6. The composite panel of claim 1, wherein the first polymer skin and the second polymer skin comprise glass-reinforced plastic.

7. The composite panel of claim 1 and further comprising an adhesive configured to bond the metallic connecting strip to the composite assembly.

8. A wall assembly for a storage container, comprising:
   a plurality of composite panels coupled together, wherein each of the plurality of composite panels includes:
      a composite assembly with a first polymer skin, a second polymer skin, and a core disposed between the first polymer skin and the second polymer skin; and
      a metallic connecting strip bonded to the composite assembly,
   wherein the metallic connecting strip includes:
      a first metallic connecting strip bonded to a first edge of the composite assembly, and
      a second metallic connecting strip bonded to a second edge of the composite assembly
   wherein the first metallic connecting strip of a first one of the plurality of composite panels is coupled to the second metallic connecting strip of an adjacent second one of the plurality of composite panels.

9. The wall assembly of claim 8 and further comprising a first adhesive configured to bond the first metallic connecting strip to the composite assembly, and a second, different adhesive configured to bond together the first metallic connecting strip of the first one of the plurality of composite panels to the second metallic connecting strip of the adjacent second one of the plurality of composite panels.

10. The wall assembly of claim 8, wherein the first metallic connecting strip extends laterally away from the composite assembly to define an overhang, and the overhang of the first one of the plurality of composite panels is coupled to the second metallic connecting strip of the adjacent second one of the plurality of composite panels.

11. The wall assembly of claim 8, wherein the storage container includes a top rail, a bottom rail, and a vertical rail, and the metallic connecting strip is bonded to one of the top rail, the bottom rail, and the vertical rail.

12. A wall assembly for a storage container, wherein the storage container includes a top rail, a bottom rail, and a vertical rail, the wall assembly comprising:
    a plurality of composite panels coupled together, wherein each of the plurality of composite panels includes:
        a composite assembly with a first polymer skin, a second polymer skin, and a core disposed between the first polymer skin and the second polymer skin; and
        a metallic connecting strip bonded to the composite assembly, wherein the metallic connecting strip is further bonded to one of the top rail, the bottom rail, and the vertical rail; and
    a first adhesive configured to bond the metallic connecting strip to the composite assembly, and a second, different adhesive configured to bond the metallic connecting strip to one of the top rail, the bottom rail, and the vertical rail.

13. The wall assembly of claim 8 and further comprising a logistics rail coupled to the metallic connecting strip.

14. A method for producing a composite panel for a vehicle, the composite panel including a composite assembly with a first polymer skin, a second polymer skin, and a core, and a metallic connecting strip, the method comprising:
    laminating the core between the first polymer skin and the second polymer skin;
    applying an adhesive strip to the metallic connecting strip for form a strip assembly;
    introducing the strip assembly to each edge of the first polymer skin;
    laminating the strip assembly to each edge of the first polymer skin
    introducing the strip assembly to each edge of the second polymer skin; and
    laminating the strip assembly to each edge of the second polymer skin.

15. The method of claim 14, wherein laminating the strip assembly includes applying heat and pressure to the strip assembly to activate the adhesive strip to bond the metallic connecting strip to the first polymer skin.

16. The method of claim 14, wherein laminating the core includes one of thermally welding the core to the first polymer skin and the second polymer skin, or bonding the core to the first polymer skin and the second polymer skin with an adhesive.

* * * * *